US012712647B2

(12) United States Patent
Bai et al.

(10) Patent No.: US 12,712,647 B2
(45) **Date of Patent: *Aug. 18, 2026**

(54) ASPECTS FOR CROSS-LINK INTERFERENCE MEASUREMENT

(71) Applicant: QUALCOMM Incorporated, San Diego, CA (US)

(72) Inventors: Tianyang Bai, Somerville, NJ (US); Yan Zhou, San Diego, CA (US); Qian Zhang, Basking Ridge, NJ (US); Junyi Li, Fairless Hills, PA (US); Tao Luo, San Diego, CA (US)

( * ) Notice: Subject to any disclaimer, the term of this patent is extended or adjusted under 35 U.S.C. 154(b) by 1071 days.

This patent is subject to a terminal disclaimer.

(21) Appl. No.: 17/715,715

(22) Filed: Apr. 7, 2022

(65) Prior Publication Data

US 2023/0327787 A1 Oct. 12, 2023

(51) Int. Cl.

| | |
|---|---|
| ***H04B 17/336*** | (2015.01) |
| ***H04W 24/10*** | (2009.01) |
| ***H04W 72/21*** | (2023.01) |
| ***H04W 72/23*** | (2023.01) |

(52) U.S. Cl.

CPC .......... *H04B 17/336* (2015.01); *H04W 24/10* (2013.01); *H04W 72/21* (2023.01); *H04W 72/23* (2023.01)

(58) Field of Classification Search

None

See application file for complete search history.

(56) References Cited

U.S. PATENT DOCUMENTS

| | | | | |
|---|---|---|---|---|
| 12,127,029 | B2 * | 10/2024 | Kim | H04B 17/345 |
| 12,418,813 | B2 | 9/2025 | Bai et al. | |
| 2019/0260486 | A1 * | 8/2019 | Kang | H04L 5/0007 |
| 2019/0273600 | A1 * | 9/2019 | Wang | H04B 17/345 |
| 2020/0044796 | A1 * | 2/2020 | Yang | H04W 56/00 |
| 2020/0067614 | A1 * | 2/2020 | Wang | H04J 11/0056 |
| 2020/0112420 | A1 * | 4/2020 | Xu | H04W 76/27 |
| 2020/0169435 | A1 | 5/2020 | Kang et al. | |
| 2020/0213052 | A1 * | 7/2020 | Li | H04W 72/23 |

(Continued)

FOREIGN PATENT DOCUMENTS

| | | | |
|---|---|---|---|
| WO | WO-2021039423 | A1 | 3/2021 |
| WO | WO-2021162334 | A1 | 8/2021 |
| WO | WO-2021248397 | A1 | 12/2021 |

OTHER PUBLICATIONS

Partial International Search Report—PCT/US2023/064343—ISA/EPO—May 26, 2023.

(Continued)

*Primary Examiner* — Phirin Sam

(57) ABSTRACT

Methods, systems, and devices for wireless communications are described. A user equipment (UE) may receive control signaling from a network entity indicating a set of cross-link interference measurement occasions and a set of receive beams associated with the set of cross-link interference measurement occasions. The UE may generate a cross-link interference report based on the control signaling and a trigger of a cross-link interference measurement. The cross-link interference report may indicate the cross-link interference measurement for at least one receive beam of the set of receive beams. The UE may transmit the cross-link interference report to the network entity.

30 Claims, 21 Drawing Sheets

(56) References Cited

U.S. PATENT DOCUMENTS

| | | | | |
|---|---|---|---|---|
| 2020/0266908 | A1* | 8/2020 | Qian | H04L 5/0062 |
| 2020/0344614 | A1* | 10/2020 | Takano | H04B 17/345 |
| 2020/0389805 | A1* | 12/2020 | Kim | H04W 72/23 |
| 2021/0258964 | A1 | 8/2021 | Khoshnevisan et al. | |
| 2021/0298000 | A1* | 9/2021 | Park | H04W 56/001 |
| 2022/0014954 | A1 | 1/2022 | Ibrahim et al. | |
| 2022/0116129 | A1* | 4/2022 | Ying | H04B 7/0617 |
| 2022/0124531 | A1* | 4/2022 | Miao | H04L 5/0051 |
| 2022/0124807 | A1* | 4/2022 | Hu | H04W 74/006 |
| 2022/0183003 | A1* | 6/2022 | Wei | H04L 5/0092 |
| 2022/0295304 | A1 | 9/2022 | Matsumura et al. | |
| 2023/0047603 | A1 | 2/2023 | Kim et al. | |
| 2023/0371135 | A1* | 11/2023 | Koga | H05B 3/84 |
| 2024/0007206 | A1* | 1/2024 | Alriksson | H04B 7/0626 |
| 2024/0365151 | A1* | 10/2024 | Wei | H04W 88/14 |

OTHER PUBLICATIONS

International Search Report and Written Opinion—PCT/US2023/064343—ISA/EPO—Aug. 3, 2023.

* cited by examiner 350
355
360
A/D
Serving cell ID
BWP ID
365
SP CLI resource set ID
370-a
TCI state ID #1
● ● ●
370-b
TCI state ID #N
301

ASPECTS FOR CROSS-LINK INTERFERENCE MEASUREMENT

FIELD OF TECHNOLOGY

The following relates to wireless communications, including aspects for cross-link interference measurement.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more network entities, each supporting wireless communication for communication devices, which may be known as user equipment (UE). In some examples of a wireless communications system, neighboring communication devices may transmit or receive communications concurrently, which my lead to cross-link interference.

SUMMARY

The described techniques relate to improved methods, systems, devices, and apparatuses that support aspects for cross-link interference measurement. For example, the described techniques provide for cross-link interference measurement and reporting by a communication device, such as a user equipment (UE). In some examples, a UE may receive control signaling from a network entity indicating a set of cross-link interference measurement occasions and a set of receive beams associated with the set of cross-link interference measurement occasions. The UE may generate a cross-link interference report based on the control signaling and a trigger of a cross-link interference measurement. The cross-link interference report may indicate the cross-link interference measurement for at least one receive beam of the set of receive beams. The UE may transmit the cross-link interference report to the network entity.

A method for wireless communication at a UE is described. The method may include receiving control signaling indicating a set of cross-link interference measurement occasions and a set of receive beams associated with the set of cross-link interference measurement occasions, generating, based on the control signaling and a trigger of a cross-link interference measurement, a cross-link interference report indicating the cross-link interference measurement for at least one receive beam of the set of receive beams, and transmitting, to a network entity, the cross-link interference report.

An apparatus for wireless communication at a UE is described. The apparatus may include a processor, memory coupled with the processor, and instructions stored in the memory. The instructions may be executable by the processor to cause the apparatus to receive control signaling indicating a set of cross-link interference measurement occasions and a set of receive beams associated with the set of cross-link interference measurement occasions, generate, based on the control signaling and a trigger of a cross-link interference measurement, a cross-link interference report indicating the cross-link interference measurement for at least one receive beam of the set of receive beams, and transmit, to a network entity, the cross-link interference report.

Another apparatus for wireless communication at a UE is described. The apparatus may include means for receiving control signaling indicating a set of cross-link interference measurement occasions and a set of receive beams associated with the set of cross-link interference measurement occasions, means for generating, based on the control signaling and a trigger of a cross-link interference measurement, a cross-link interference report indicating the cross-link interference measurement for at least one receive beam of the set of receive beams, and means for transmitting, to a network entity, the cross-link interference report.

A non-transitory computer-readable medium storing code for wireless communication at a UE is described. The code may include instructions executable by a processor to receive control signaling indicating a set of cross-link interference measurement occasions and a set of receive beams associated with the set of cross-link interference measurement occasions, generate, based on the control signaling and a trigger of a cross-link interference measurement, a cross-link interference report indicating the cross-link interference measurement for at least one receive beam of the set of receive beams, and transmit, to a network entity, the cross-link interference report.

Some examples of the method, apparatuses, and non-transitory computer-readable medium described herein may further include operations, features, means, or instructions for performing, at an occasion of the set of cross-link interference measurement occasions, a cross-link interference measurement procedure to generate the cross-link interference measurement using a receive beam of the set of receive beams that corresponds to the occasion, where the trigger includes the occasion.

Some examples of the method, apparatuses, and non-transitory computer-readable medium described herein may further include operations, features, means, or instructions for receiving a downlink control information (DCI) message indicating an occasion of the set of cross-link interference measurement occasions and a receive beam corresponding to the occasion and performing, at the occasion, a cross-link interference measurement procedure to generate the cross-link interference measurement using the receive beam, where the trigger includes the occasion indicated by the DCI message.

In some examples of the method, apparatuses, and non-transitory computer-readable medium described herein, the DCI message may be scrambled with a radio network temporary identifier (RNTI) that indicates the UE to generate the cross-link interference measurement, the cross-link interference report transmitted on an uplink shared channel.

In some examples of the method, apparatuses, and non-transitory computer-readable medium described herein, receiving the control signaling indicating the set of cross-link interference measurement occasions and the set of receive beams associated with the set of cross-link interference measurement occasions may include operations, features, means, or instructions for receiving a media access control control element (MAC-CE) indicating the set of cross-link interference measurement occasions and the set of receive beams; and the method further includes and performing, at an occasion of the set of cross-link interference measurement occasions, a cross-link interference measurement procedure to generate the cross-link interference measurement using a receive beam of the set of receive beams that corresponds to the occasion, where the trigger includes the occasion indicated by the MAC-CE.

Some examples of the method, apparatuses, and non-transitory computer-readable medium described herein may further include operations, features, means, or instructions for transmitting an acknowledgment message responsive to the MAC-CE, where the cross-link interference report may be transmitted on an uplink control channel according to at least an offset from transmitting the acknowledgment message.

Some examples of the method, apparatuses, and non-transitory computer-readable medium described herein may further include operations, features, means, or instructions for performing a cross-link interference measurement procedure to generate the cross-link interference measurement based on the UE detecting an event, where the event includes the trigger.

In some examples of the method, apparatuses, and non-transitory computer-readable medium described herein, transmitting the cross-link interference report may include operations, features, means, or instructions for transmitting, on an uplink control channel, an uplink control information message that includes the cross-link interference report.

Some examples of the method, apparatuses, and non-transitory computer-readable medium described herein may further include operations, features, means, or instructions for transmitting a scheduling request to the network entity and receiving control signaling indicating uplink resources of a shared channel in response to the scheduling request, where transmitting the cross-link interference report includes transmitting, on the uplink resources of the shared channel, a MAC-CE including the cross-link interference report.

In some examples of the method, apparatuses, and non-transitory computer-readable medium described herein, the at least one receive beam includes a default receive beam and the method, apparatuses, and non-transitory computer-readable medium may include further operations, features, means, or instructions for selecting the default receive beam for the cross-link interference measurement based on an offset between a DCI message and an occasion indicated by the DCI message for the cross-link interference measurement being less than a threshold offset, where the default receive beam may be different than a second receive beam of the set of receive beams that may be associated with the occasion.

Some examples of the method, apparatuses, and non-transitory computer-readable medium described herein may further include operations, features, means, or instructions for transmitting, to the network entity, UE capability signaling indicating the threshold offset.

In some examples of the method, apparatuses, and non-transitory computer-readable medium described herein, the threshold offset includes a first offset value and a second offset value and the second offset value may be based on whether the DCI message and the occasion indicated by the DCI message may be associated with a same subcarrier spacing.

Some examples of the method, apparatuses, and non-transitory computer-readable medium described herein may further include operations, features, means, or instructions for identifying a quasi co-location (QCL) relationship for a downlink signal received at the UE, where the network entity communicates with the UE via a single transmission-reception point and performing, at an occasion of the set of cross-link interference measurement occasions, a measurement procedure to generate the cross-link interference measurement using the QCL relationship based on the downlink signal overlapping the occasion.

Some examples of the method, apparatuses, and non-transitory computer-readable medium described herein may further include operations, features, means, or instructions for identifying a first QCL relationship for a downlink signal received at the UE, where the network entity communicates with the UE via a single transmission-reception point and performing, at an occasion of the set of cross-link interference measurement occasions, a measurement procedure to generate the cross-link interference measurement using a second QCL relationship associated with a lowest control resource set (CORESET) identifier based on the downlink signal not overlapping the occasion.

Some examples of the method, apparatuses, and non-transitory computer-readable medium described herein may further include operations, features, means, or instructions for selecting the at least one receive beam of the set of receive beams for the cross-link interference measurement based on, for single DCI message operation with a set of multiple transmission-reception points, a transmission configuration indicator (TCI) codepoint having a lowest identifier value and that identifies a set of multiple TCI states corresponding to the set of multiple transmission-reception points, for multiple DCI message operation for a set of multiple transmission-reception points, a TCI state associated with a most recently monitored CORESET for each CORESET pool, for single frequency network (SNF) operation, a TC codepoint having a lowest identifier value, and for cross-carrier scheduling operation, a TCI codepoint having a lowest identifier value.

A method for wireless communication at a network entity is described. The method may include outputting control signaling indicating a set of cross-link interference measurement occasions and a set of receive beams associated with the set of cross-link interference measurement occasions for a UE to use to generate a cross-link interference report and obtaining, from the UE, the cross-link interference report indicating a cross-link interference measurement for at least one receive beam of the set of receive beams.

An apparatus for wireless communication at a network entity is described. The apparatus may include a processor, memory coupled with the processor, and instructions stored in the memory. The instructions may be executable by the processor to cause the apparatus to output control signaling indicating a set of cross-link interference measurement occasions and a set of receive beams associated with the set of cross-link interference measurement occasions for a UE to use to generate a cross-link interference report and obtain, from the UE, the cross-link interference report indicating a cross-link interference measurement for at least one receive beam of the set of receive beams.

Another apparatus for wireless communication at a network entity is described. The apparatus may include means for outputting control signaling indicating a set of cross-link interference measurement occasions and a set of receive beams associated with the set of cross-link interference measurement occasions for a UE to use to generate a cross-link interference report and means for obtaining, from the UE, the cross-link interference report indicating a cross-link interference measurement for at least one receive beam of the set of receive beams.

A non-transitory computer-readable medium storing code for wireless communication at a network entity is described. The code may include instructions executable by a processor to output control signaling indicating a set of cross-link interference measurement occasions and a set of receive beams associated with the set of cross-link interference measurement occasions for a UE to use to generate a cross-link interference report and obtain, from the UE, the cross-link interference report indicating a cross-link interference measurement for at least one receive beam of the set of receive beams.

Some examples of the method, apparatuses, and non-transitory computer-readable medium described herein may further include operations, features, means, or instructions for outputting a DCI message indicating an occasion of the set of cross-link interference measurement occasions and a receive beam corresponding to the occasion, where the cross-link interference measurement may be generated using the receive beam at least in part in response to a trigger that includes the occasion indicated by the DCI message.

In some examples of the method, apparatuses, and non-transitory computer-readable medium described herein, the DCI message may be scrambled with an RNTI that indicates the UE to generate the cross-link interference measurement, the cross-link interference report obtained on an uplink shared channel.

In some examples of the method, apparatuses, and non-transitory computer-readable medium described herein, outputting the control signaling indicating the set of cross-link interference measurement occasions and the set of receive beams associated with the set of cross-link interference measurement occasions may include operations, features, means, or instructions for outputting a MAC-CE indicating the set of cross-link interference measurement occasions and the set of receive beams, where the cross-link interference measurement may be generated using the at least one receive beam at least in part in response to a trigger that includes and occasion of the set of cross-link interference measurement occasions indicated by the MAC-CE.

Some examples of the method, apparatuses, and non-transitory computer-readable medium described herein may further include operations, features, means, or instructions for obtaining an acknowledgment message responsive to the MAC-CE, where the cross-link interference report may be transmitted on an uplink control channel according to at least an offset from transmitting the acknowledgment message.

In some examples of the method, apparatuses, and non-transitory computer-readable medium described herein, the cross-link interference measurement of the cross-link interference report may be generated based on an event detect at the UE.

In some examples of the method, apparatuses, and non-transitory computer-readable medium described herein, obtaining the cross-link interference report may include operations, features, means, or instructions for obtaining, on an uplink control channel, uplink control information including the cross-link interference report.

Some examples of the method, apparatuses, and non-transitory computer-readable medium described herein may further include operations, features, means, or instructions for obtaining a scheduling request from the UE and outputting control signaling indicating uplink resources of a shared channel in response to the scheduling request, where obtaining the cross-link interference report includes obtaining, on the uplink resources of the shared channel, a MAC-CE including the cross-link interference report.

Some examples of the method, apparatuses, and non-transitory computer-readable medium described herein may further include operations, features, means, or instructions for obtaining UE capability signaling indicating a threshold offset for an offset between a DCI message and an occasion indicated by the DCI message for the cross-link interference measurement.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

DETAILED DESCRIPTION

Figure 1:
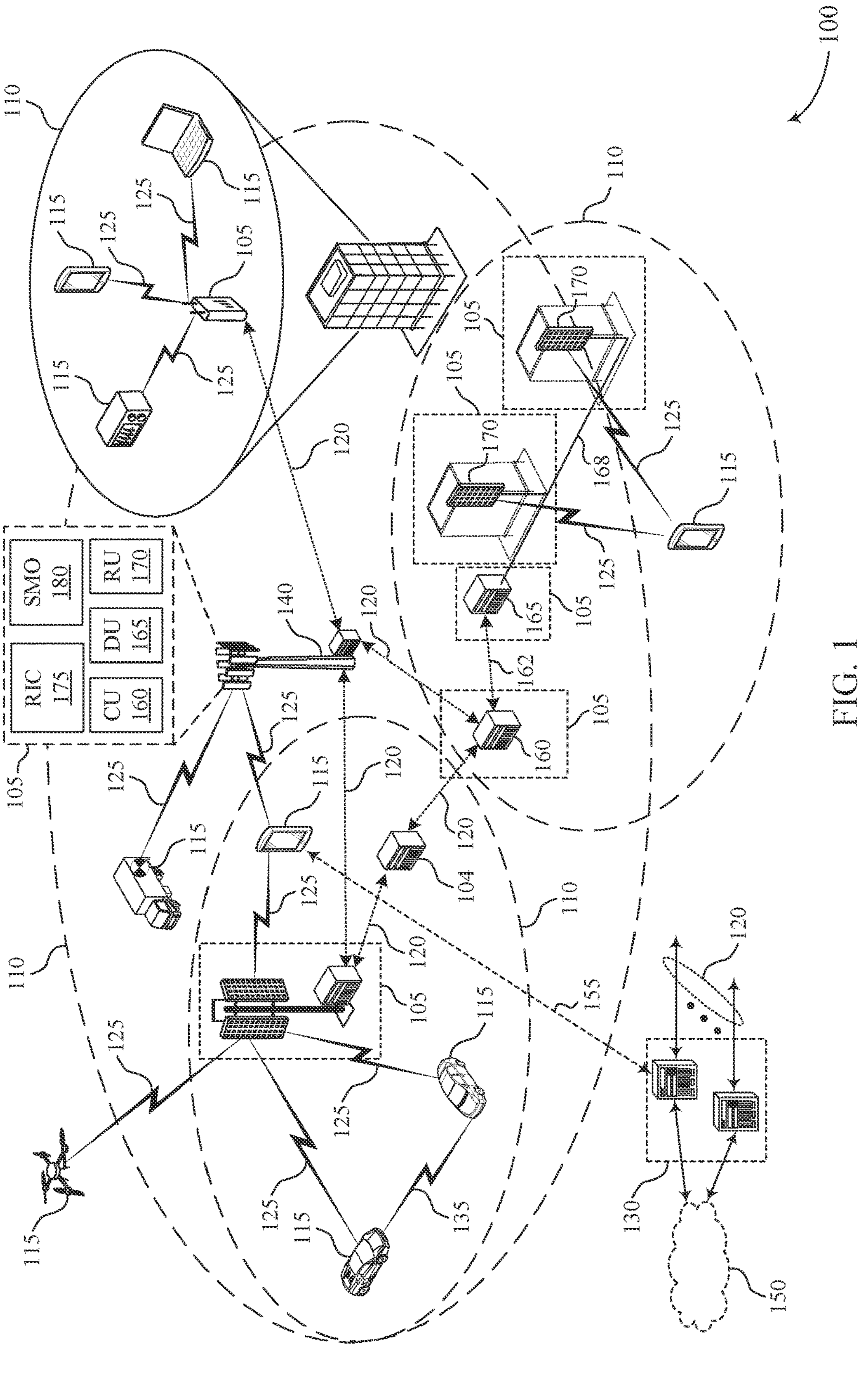
FIG. 1 illustrates an example of a wireless communications system that supports aspects for cross-link interference measurement in accordance with one or more aspects of the present disclosure.

In some wireless communications systems, a communication device, such as a user equipment (UE) or a network entity, may support wireless communications over one or multiple radio access technologies. Examples of radio access technologies may include fourth generation (4G) systems, such as Long Term Evolution (LTE) systems, and fifth generation (5G) systems, which may be referred to as New Radio (NR) systems. In such cases, the communication device may operate in a half-duplex mode or a full-duplex mode, or a combination thereof. In a half-duplex mode, the communication device may either transmit communications or receive communications during a time period, such as a transmission time interval (TIT) that may span one or more time resources (e.g., symbols, mini-slots, slot, etc.). In a full-duplex mode, the communication device may simultaneously transmit and receive communications during the time period. That is, communications received by the communication device may overlap in the time domain with communications transmitted by the communication device. For example, symbols occupied by received signals may overlap with symbols occupied by transmitted signals.

In some examples, neighboring communication devices (e.g., UEs, network entities) may perform full-duplex communications or half-duplex time division duplexing (TDD) concurrently, such that communications received by a first communication device may overlap in time with communications transmitted by a second communication device (e.g., a neighboring communication device). In such an example, the communications transmitted by the second communication device may interfere with the communications received at the first communication device. Such interference may be referred to as cross-link interference. In some examples, cross-link interference may degrade wireless communications between the first communication device and the network. Therefore, to mitigate effects of cross-link interference, the network may configure the first communication device to measure and report cross-link interference.

In some examples, the network may configure a communication device (e.g., a UE) to perform cross-link interference reporting via higher layer (e.g., layer 3 (L3), radio resource control (RRC) layer) signaling. In some examples, however, higher layer signaling may be relatively inflexible and associated with an increased latency (e.g., relative to lower layer signaling) due to updating a higher layer cross-link interference configuration. As such, higher layer cross-link interference reporting may not be (or be less) suitable for scenarios in which cross-link interference changes dynamically relative the increased latency associated with higher layer configuration signaling. Moreover, higher layer cross-link interference measurements may lack spatial granularity, for example such that higher layer cross-link interference reporting may not capture beam-level cross-link interference.

Various aspects of the present disclosure generally relate to techniques for cross-link interference measurement, and more specifically, to techniques for configuring a communication device, such as a UE, to measure and report cross-link interference via lower layer (e.g., layer 1 (L1), physical (PHY) layer, layer 2 (L2), media access control (MAC) layer) signaling. For example, the network may configure the communication device to measure and report cross-link interference periodically, semi-persistently, or aperiodically, thereby increasing the flexibility and decreasing the latency of cross-link interference reporting (e.g., relative to higher layer cross-link interference reporting). Additionally, or alternatively, the network may increase the granularity of cross-link interference reporting by configuring the communication device to measure and report cross-link interference based on one or more transmission configuration indicator (TCI) states (e.g., which may also be referred to herein as beams, receive beams (at UE for downlink or sidelink), transmit beams (at a UE for uplink or sidelink), beam configurations, or beam configuration states or modes) associated with resources configured for performing the cross-link interference measurements.

For example, the network may configure the communication device with one or more resources for performing cross-link interference measurements (e.g., on reference signals transmitted by another communication device) and each of the configured resources may be associated with a transmission configuration indicator state to be used by the communication device for performing the cross-link interference measurements. The configured resources may be periodic, semi-persistent, or aperiodic. Additionally, or alternatively, the network my configure the communication device with one or more resources for transmitting a cross-link interference report (e.g., indicating the measured cross-link interference). The network may configure the communication device to report cross-link interference periodically, semi-persistently, or aperiodically. For example, the network may configure the communication device (e.g., via RRC signaling) with periodic resources over which the communication device may transmit a cross-link interference report. Additionally, or alternatively, the network may aperiodically trigger the communication device to transmit a cross-link interference report, for example via a downlink control information (DCI) message or signaling. Additionally, or alternatively, the network may configure the communication device with semi-persistent resource for transmitting a cross-link interference report that may be activated (e.g., triggered), for example via a media access control control element (MAC-CE) or a DCI message or signaling. Additionally, or alternatively, the network may configure the communication device to transmit a report based on an event, such a cross-link interference measurement satisfying (or failing to satisfy) a threshold.

Particular aspects of the subject matter described herein may be implemented to realize one or more of the following potential advantages. The techniques employed by the described communication devices may provide benefits and enhancements to the operation of the communication devices, including enabling cross-link interference measurement and reporting via lower layer signaling. Further, aspects for cross-link interference measurement, as described herein, may support higher data rates, spectrum efficiency enhancement, and efficient resource utilization, thereby improving throughput and reliability. Such techniques may therefore lead to improved network operations and network efficiencies, among other benefits.

Aspects of the disclosure are initially described in the context of wireless communications systems. Aspects of the disclosure are also described in the context of a network architecture, another wireless communications system, a MAC-CE, timing diagrams, and process flows. Aspects of the disclosure are further illustrated by and described with reference to apparatus diagrams, system diagrams, and flowcharts that relate to aspects for cross-link interference measurement.

FIG. 1 illustrates an example of a wireless communications system 100 that supports aspects for cross-link interference measurement in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission-reception point. One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., RRC), service data adaption protocol (SDAP). Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, MAC layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104. UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support aspects for cross-link interference measurement as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set) for a physical control channel may be defined by a set of symbol periods and may extend across the system bandwidth or a subset of the system bandwidth of the carrier. One or more control regions (e.g., control resource set) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

The wireless communications system 100 may support aspects for cross-link interference measurement. For example, a UE 115 may receive control signaling from a network entity 105 indicating a set of cross-link interference measurement occasions and a set of receive beams associated with the set of cross-link interference measurement occasions. The UE 115 may generate a cross-link interference report based on the control signaling and a trigger of a cross-link interference measurement. The cross-link interference report may indicate the cross-link interference measurement for at least one receive beam of the set of receive beams. The UE 115 may transmit the cross-link interference report to the network entity 105. In some examples, by transmitting the cross-link interference report to the network entity 105, the UE 115 may provide one or more enhancements to cross-link interference mitigation performed by the network, among other benefits.

Figure 2:
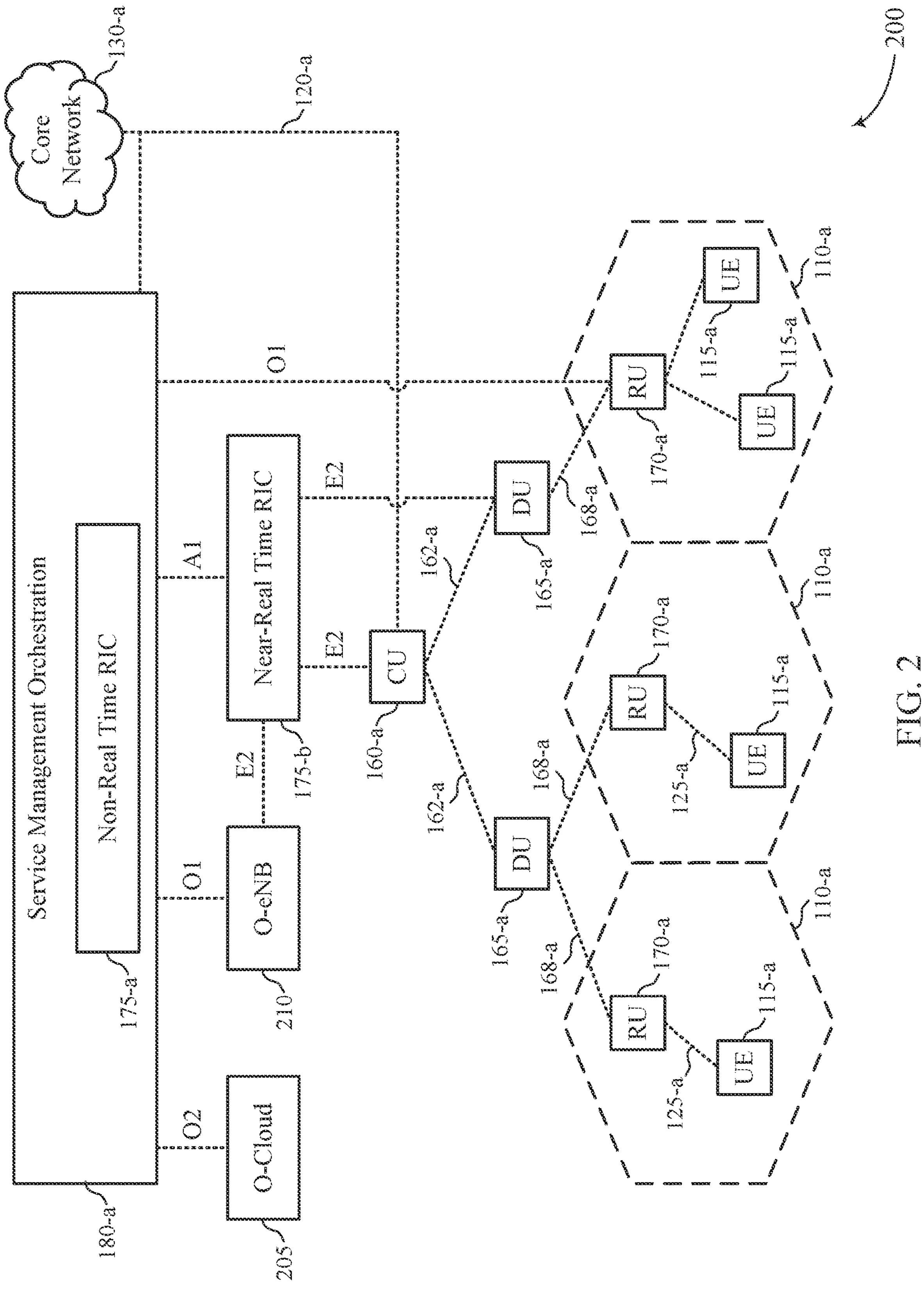
FIG. 2 illustrates an example of a network architecture that supports aspects for cross-link interference measurement in accordance with one or more aspects of the present disclosure.

FIG. 2 illustrates an example of a network architecture 200 that (e.g., a disaggregated base station architecture, a disaggregated RAN architecture) that supports aspects for cross-link interference measurement in accordance with one or more aspects of the present disclosure. The network architecture 200 may illustrate an example for implementing one or more aspects of the wireless communications system 100. The network architecture 200 may include one or more CUs 160-*a* that may communicate directly with a core network 130-*a* via a backhaul communication link 120-*a*, or indirectly with the core network 130-*a* through one or more disaggregated network entities 105 (e.g., a Near-RT RIC 175-*b* via an E2 link, or a Non-RT RIC 175-*a* associated with an SMO 180-*a* (e.g., an SMO Framework), or both). A CU 160-*a* may communicate with one or more DUs 165-*a* via respective midhaul communication links 162-*a* (e.g., an F1 interface). The DUs 165-*a* may communicate with one or more RUs 170-*a* via respective fronthaul communication links 168-*a*. The RUs 170-*a* may be associated with respective coverage areas 110-*a* and may communicate with UEs 115-*a* via one or more communication links 125-*a*. In some implementations, a UE 115-*a* may be simultaneously served by multiple RUs 170-*a*.

Each of the network entities 105 of the network architecture 200 (e.g., CUs 160-*a*, DUs 165-*a*, RUs 170-*a*. Non-RT RICs 175-*a*, Near-RT RICs 175-*b*, SMOs 180-*a*, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-*a* may host one or more higher layer control functions. Such control functions may include RRC, PDCP, SDAP, or the like. Each control function may be implemented with an interface configured to communicate signals with other control functions hosted by the CU 160-*a*. A CU 160-*a* may be configured to handle user plane functionality (e.g., CU-UP), control plane functionality (e.g., CU-CP), or a combination thereof. In some examples, a CU 160-*a* may be logically split into one or more CU-UP units and one or more CU-CP units. A CU-UP unit may communicate bidirectionally with the CU-CP unit via an interface, such as an E1 interface when implemented in an O-RAN configuration. A CU 160-*a* may be implemented to communicate with a DU 165-*a*, as necessary, for network control and signaling.

A DU 165-*a* may correspond to a logical unit that includes one or more functions (e.g., base station functions, RAN functions) to control the operation of one or more RUs 170-*a*. In some examples, a DU 165-*a* may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-*a* may further host one or more low PHY layers. Each layer may be implemented with an interface configured to communicate signals with other layers hosted by the DU 165-*a*, or with control functions hosted by a CU 160-*a*.

In some examples, lower-layer functionality may be implemented by one or more RUs 170-*a*. For example, an RU 170-*a*, controlled by a DU 165-*a*, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-*a* may be implemented to handle over the air (OTA) communication with one or more UEs 115-*a*. In some implementations, real-time and non-real-time aspects of control and user plane communication with the RU(s) 170-*a* may be controlled by the corresponding DU 165-*a*. In some examples, such a configuration may enable a DU 165-*a* and a CU 160-*a* to be implemented in a cloud-based RAN architecture, such as a vRAN architecture.

The SMO 180-*a* may be configured to support RAN deployment and provisioning of non-virtualized and virtualized network entities 105. For non-virtualized network entities 105, the SMO 180-*a* may be configured to support the deployment of dedicated physical resources for RAN coverage requirements which may be managed via an operations and maintenance interface (e.g., an O1 interface). For virtualized network entities 105, the SMO 180-*a* may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-*a*, DUs 165-*a*, RUs 170-*a*, and Near-RT RICs 175-*b*. In some implementations, the SMO 180-*a* may communicate with components configured in accordance with a 4G RAN (e.g., via an O1 interface). Additionally, or alternatively, in some implementations, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-*b*. The Non-RT RIC 175-*a* may be coupled to or communicate with (e.g., via an A1 interface) the Near-RT RIC 175-*b*. The Near-RT RIC 175-*b* may be configured to include a logical function that enables near-real-time control and optimization of RAN elements and resources via data collection and actions over an interface (e.g., via an E2 interface) connecting one or more CUs 160-*a*, one or more DUs 165-*a*, or both, as well as an O-eNB 210, with the Near-RT RIC 175-*b*.

In some examples, to generate AI/ML models to be deployed in the Near-RT RIC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some examples, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (e.g., reconfiguration via O1) or via generation of RAN management policies (e.g., A1 policies).

The network architecture 200 may support aspects for cross-link interference measurement and reporting. In some examples, a network entity (e.g., a CU 160-*a*, a DU 165-*a*, an RU 170-*a* or the like) may configure a UE 115-*a* to perform cross-link interference reporting via higher layer signaling. In some examples of higher layer cross-link interference reporting, the CU 160-*a* may obtain a cross-link interference report from the UE 115-*a* via the DU 165-*a*. In some examples, however, communicating the cross-link interference report between the CU 160-*a* and the DU 165-*a* (e.g., via the fronthaul communication link 168-*a*) may lead to increased latency relative to lower layer (e.g., L1, PHY layer, L2, MAC layer) signaling, in which information may be obtained from the UE 115 by the DU 165-*a*.

Therefore, the network may configure the UE 115-*a* to report cross-link interference measurements via lower layer signaling. In some examples, these techniques may reduce latency associated with cross-link interference reporting. For example, the network entity (e.g., the DU 165-*a*, the RU 170-*a*) may output control signaling indicating a set of cross-link interference measurement occasions and a set of receive beams associated with the set of cross-link interference measurement occasions for the UE 115-*a* to use to generate a cross-link interference report. The network entity (e.g., the DU 165-*a*, the RU 170-*a*) may obtain, from the UE 115-*a*, the cross-link interference report indicating a cross-link interference measurement for at least one receive beam of the set of receive beams. In some examples, in response to receiving the cross-link interference report, the network entity (e.g., the CU 160-*a*, the DU 165-*a*, the RU 170-*a* or the like) may perform one or more cross-link interference mitigation techniques. Such techniques may lead to increased reliability of wireless communications between the UEs 115-*a* and the network.

Figure 3A:
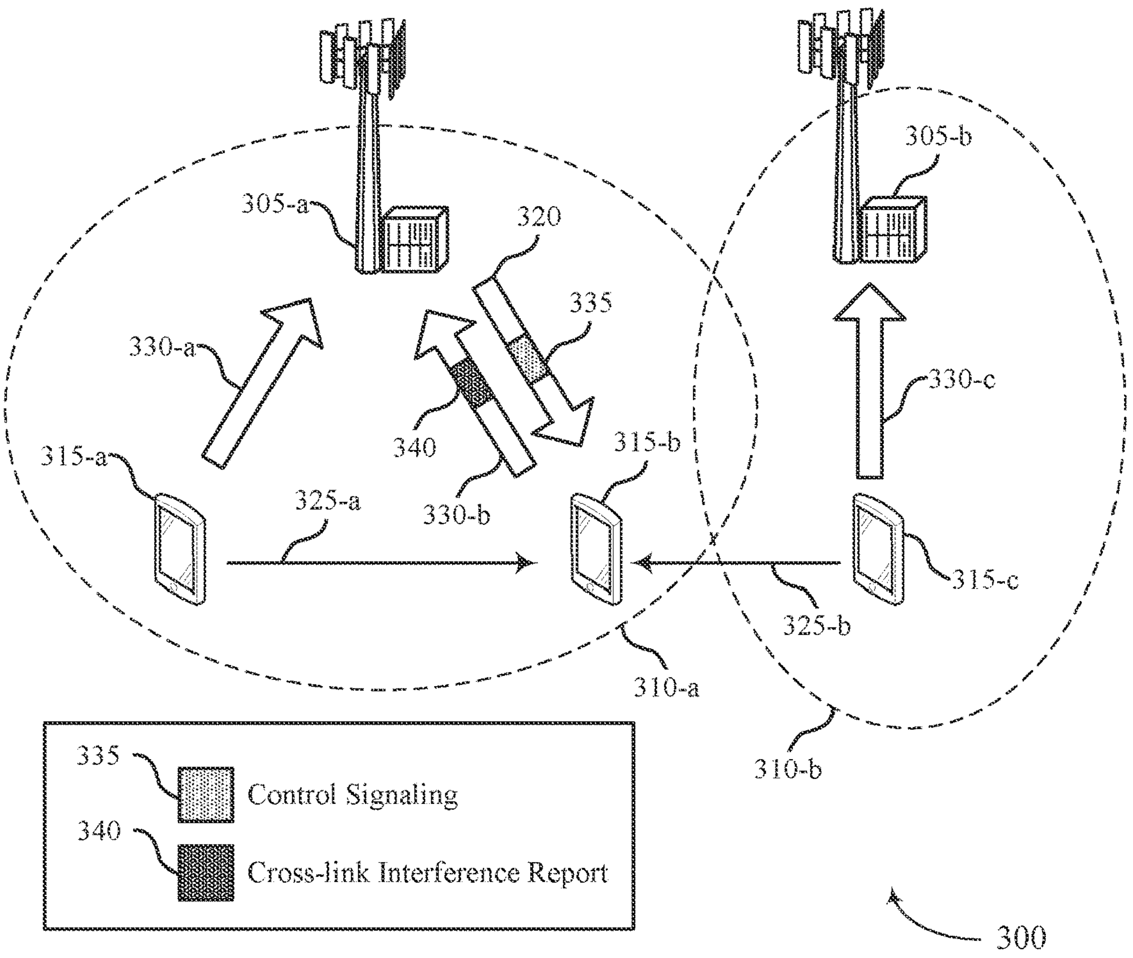
FIG. 3A illustrates an example of a wireless communications system that supports aspects for cross-link interference measurement in accordance with one or more aspects of the present disclosure.

FIG. 3A illustrates an example of a wireless communications system 300 that supports aspects for cross-link interference measurement in accordance with one or more aspects of the present disclosure. In some examples, the wireless communications system 300 may implement or be implemented by one or more aspects of the wireless communications system 100. For example, the wireless communications system 300 may include one or more UEs 315 (e.g., a UE 315-*a*, a UE 315-*b*, and a UE 315-*c*), which may be examples of a UE 115 described with reference to FIG. 1. The wireless communications system 300 may also include one or more network entities 305 (e.g., a network entity 305-*a* and a network entity 305-*b*), which may be examples of one or more network entities 105 (e.g., a CU, a DU, an RU, a base station, an IAB node, a transmission-reception point, or one or more other network nodes) as described with reference to FIG. 1. The network entities 305 and the UEs 315 may communicate within one or more coverage areas 310 (e.g., a coverage area 310-*a*, a coverage area 310-*b*), which may be examples of a coverage area 110 as described with reference to FIG. 1 or FIG. 2. In the example, of FIG. 3A, the network entity 305-*a* may serve a cell providing the coverage area 310-*a* and the network entity 305-*b* may serve a cell providing the coverage area 310-*b*. The wireless communications system 300 may include features for improved communications between the UE 315 and the network, among other benefits.

In the example of FIG. 3A, the UEs 315 and the network entities 305 may communicate via one or more communication links. For example, the UE 315-*a* may transmit communications (e.g., uplink communications) to the network entity 305-*a* via a communication link 330-*a* and the UE 315-*c* may transmit communications to the network entity 305-*b* via a communication link 330-*c*. Additionally, or alternatively, the UE 315-*b* may transmit communications to the network entity 305-*a* via a communication link 330-*b* and receive communications from the network entity 305-*a* via a communication link 320. In the example of FIG. 3A, the communication links 330 may be examples of uplinks and the communication link 320 may be an example of a downlink. The communication links 330 and the communication link 320 may each be examples of a communication link 125 as described with reference to FIG. 1.

In some examples, neighboring communication devices (e.g., at least two of the UE 315-*a*, the UE 315-*b*, and the UE 315-*c*) may perform half-duplex TDD communications (or full-duplex communications) concurrently, such that downlink communications received by a first communication device may overlap in time with uplink communications transmitted by a second communication device (e.g., a neighboring communication device). For example, the network entity 305-*a* and the network entity 305-*b* may perform full-duplex communications concurrently, such that uplink communications transmitted by the UE 315-*c* to the network entity 305-*b* (e.g., the serving cell of the UE 315-*c*) may overlap in time with downlink communications received by the UE 315-*b* from the network entity 305-*a* (e.g., the serving cell of the UE 315-*b*).

While the UE 315-*b* and the UE 315-*c* may communicate over different cells, the UE 315-*b* and the UE 315-*c* may be spatially located, such that the uplink communications transmitted by the UE 315-*c* may interfere with the downlink communications received at the UE 315-*b*. For example, the uplink communications transmitted by the UE 315-*c* may lead to cross-link interference 325-*b* (e.g., inter-cell cross-link interference) at the UE 315-*b*. Additionally, or alternatively, the network entity 305-*a* may perform full-duplex communications, such that uplink communications transmitted by the UE 315-*a* to the network entity 305-*a* may overlap in time with downlink communications received by the UE 315-*b* from the network entity 305-*a*. In such an example, the uplink communications transmitted by the UE 315-*a* may interfere with the downlink communications received at the UE 315-*b*. That is, the uplink communications transmitted by the UE 315-*a* may lead to cross-link interference 325-*a* (e.g., intra-cell cross-link interference) at the UE 315-*b*. In some examples, the cross-link interference 325-*a* and the cross-link interference 325-*b* may degrade downlink communications received at the UE 315-*b*.

To mitigate (e.g., control) cross-link interference (e.g., in a dynamic TDD scheme), the network may employ a cross-link interference measurement and reporting scheme, in which the network may enable the UE 315-*b* (e.g., a downlink UE) to measure cross-link interference from neighboring UEs 315 and report the measured interference to the network. For example, the network may configure the UE 315-*b* to measure the cross-link interference 325-*a* (e.g., from the UE 315-*a*) and the cross-link interference 325-*b* (e.g., from the UE 315-*c*) and report the cross-link interference measurements to the network. In some examples of cross-link interference reporting, the network may configure the UE 315-*a* (e.g., the uplink UE) to transmit reference signals (e.g., sounding reference signals (SRSs)) to be received and measured by the UE 315-*b* (e.g., a peer, neighbor, or sidelink UE, which may be the downlink UE from network entity 305-*a*). For example, the UE 315-*a* may transmit SRSs, while the UE 315-*b* may receive and measure the strength of the resulting interference. That is, the UE 315-*b* may measure the interference resulting from concurrent transmission of SRSs by the UE 315-*a* and downlink transmissions by the network entity 305-*a*. In some examples, the UE 315-*b* (e.g., the downlink UE) may report the cross-link interference measurements as (e.g., in terms of) received power measurements, such as a power measurement (e.g., a reference signal received power (RSRP) measurement, such as synchronization signal reference signal received power (SS-RSRP) measurements) or a signal strength measurement (e.g., a received signal strength indicator (CLI-RSSI) measurement, such as cross-link interference received signal strength indicator (CLI-RSSI) measurements).

In some examples, the network (e.g., the network entity 305-*a*) may schedule communications for the UE 315-*b* (or the UE 315-*a*) based on the cross-link inference report. For example, to reduce the effects of cross-link interference 325-*a*, the network may schedule the UE 315-*a* to transmit uplink communications over time and frequency resources different from the time and frequency resources allocated for the UE 315-*b* to receive downlink communications, thereby reducing (e.g., avoiding) cross-link interference (e.g., intra-cell cross-link interference) at the UE 315-*b*. Additionally, or alternatively, the network entity 305-*a* and the network entity 305-*b* may coordinate scheduling of the UE 315-*b* and the UE 315-*c*, such that the resources scheduled for downlink receptions by the UE 315-*b* may be orthogonal to the resources scheduled for uplink transmissions by the UE 315-*c*, thereby reducing (e.g., avoiding) the cross-link interference (e.g., the inter-cell cross-link interference) at the UE 315-*b*. For scenarios, use cases, or examples in which a full-duplex network entity serves downlink UEs and uplink UEs concurrently, the downlink UE may have an increased likelihood of experiencing intra-cell cross-link interference (e.g., relative to inter-cell cross-link interference). For example, the UE 315-*b* may have an increased likelihood of experiencing intra-cell cross-link interference from the UE 315-*a* relative to the UE 315-*b*.

In some examples, the network may configure the UE 315-*b* to measure and report cross-link interference via higher layer (e.g., L3, RRC layer) signaling. In some examples, however, the UEs 315 may move throughout the coverage area 310-*a* or the coverage area 310-*b* (or both), which may lead to dynamic changes in cross-link interference that may not be captured by higher layer cross-link interference reporting. That is, a latency associated with higher layer cross-link interference reporting may not be suitable for scenarios in which cross-link interference changes dynamically.

In some examples of higher layer cross-link interference reporting, the network may configure the UE 315-*b* (e.g., the downlink UE) to report cross-link interference measurements periodically (or based on one or more predefined triggering conditions). In such an example, the network (e.g., a DU of the network) may obtain (e.g., collect) a cross-link interference report from the UE 315-*b*, which may then be communicated (e.g., transmitted, signaled, output) to a CU of the network. In some examples, communicating information from the UE 315-*b*, such as the cross-link interference report, between the CU and the DU may lead to increased latency (e.g., additional latency) relative to lower layer (e.g., L1, PHY layer, L2, MAC layer) signaling, in which information may be obtained (e.g., collected) from the UE 315-*b* by the DU. Additionally. or alternatively, as part of higher layer cross-link interference reporting, the UE 315-*b* may be configured to filter (e.g., perform higher layer filtering of) the cross-link interference measurements. In some examples, however, such filtering may not be suitable for beam switching (e.g., relatively fast beam switching) in response to variations in the measured cross-link interference (e.g., over a time duration). For example, configuration (e.g., reconfiguration) of a beam for wireless communications with the network via higher layer signaling (e.g., via an RRC configuration) may be inflexible and associated with a latency that may not be suitable for scenarios in which channel conditions change dynamically, for example due to fluctuating cross-link interference.

Some aspects for cross-link interference measurement, as described herein, may provide one or more enhancements to cross-link interference reporting (e.g., may provide for an enhanced cross-link interference framework), thereby increasing cross-link interference mitigation (e.g., handling, control) within the wireless communications system 300. For example, the network may configure the UE 315-*b* to perform cross-link interference measurement and reporting via lower layer signaling. In some examples, lower layer cross-link interference reporting may capture cross-link interference (e.g., current cross-link interference) experienced by the UE 315-*b*. Additionally, or alternatively, lower layer cross-link interference reporting may enable the network to request cross-link interference information (e.g., a cross-link interference report) for beam selection with reduced latency (e.g., a relatively low latency), for example based on traffic conditions.

In some examples of lower layer cross-link interference reporting, the network may configure the UE 315-*b* with one or more resources for performing cross-link interference measurements on reference signals (e.g., SRSs) transmitted by another UE 315 (e.g., the UE 315-*a*). Additionally, or alternatively, the network may configure the UE 315-*b* with one or more resources for transmitting a cross-link interference report (e.g., indicating the cross-link interference measurements). The network may configure the UE 315-*b* to measure cross-link interference periodically, semi-persistently, or aperiodically. For example, the network may configure the UE 315-*b* for cross-link interference reporting with periodic resources, semi-persistent resources, or aperiodic resources (e.g., dynamic resources). Additionally, or alternatively, the network may configure the UE 315-*b* to transmit a cross-link interference report periodically, semi-persistently, or aperiodically. For example, the network may configure the UE 315-*b* for cross-link interference with a periodic report, a semi-persistent report, or an aperiodic report (i.e., with one or more report types). In some examples, the network may configure the UE 315-*b* with a combination of cross-link interference resources (e.g., periodic resources, semi-persistent resources, or aperiodic resources) and a report type (e.g., a periodic report, a semi-persistent report, or an aperiodic report) in accordance with the following Table 1:

TABLE 1

| | Periodic Report | Semi-persistent Report | Aperiodic Report |
|---|---|---|---|
| Periodic Resources | Yes | Yes | Yes |
| Semi-persistent Resources | No | Yes | Yes |
| Aperiodic Resources | No | No | Yes |

In accordance with Table 1, "Yes" may indicate that the corresponding combination of resources and report type may be suitable (e.g., applicable) for cross-link interference reporting. For example, in accordance with Table 1, the network may configure the UE 315-*b* for cross-link interference reporting with periodic resources a periodic report type. Additionally, or alternatively, "No" may indicate that the corresponding combination of resources and report type may not be suitable (e.g., may not be applicable) for cross-link interference reporting. For example, in accordance with Table 1, the network may refrain from configuring the UE 315-*b* for cross-link interference reporting with semi-persistent resources and a periodic report type.

In some examples, the network may configure the UE 315-*b* with resources for performing the cross-link interference measurements (e.g., cross-link interference resources) via control signaling. For example, the UE 315-*b* may receive control signaling 335 indicating a set of cross-link interference resources (e.g., a set of cross-link interference measurement occasions). The set of cross-link interference resources may include SRS resources (e.g., L1 SRS resources), RSSI resources (e.g., L1 RSSI resources), or both. In some examples, the set of cross-link interference resources may be associated with a set of receive beams (e.g., TCI states, beam configurations, beam configuration states, or just beams). For example, each cross-link interference resource (e.g., of the configured set of cross-link interference resource) may be associated with a TCI state to be used by the UE 315-*b* for determining a receive beam for performing the cross-link interference measurements. In some examples, the UE 315-*b* may determine a receive beam for performing the cross-link interference measurements over one or more of the configured cross-link interference resources based on a quasi co-location (QCL) relationship of the associated TCI state.

In some examples, the network may indicate a TCI state corresponding to a cross-link interference resource (or multiple cross-link interference resources) via control signaling. For example, the network may configure a TCI state corresponding to one or more periodic cross-link interference resources via RRC signaling (e.g., an RRC configuration). Additionally. or alternatively, the network may configure a TCI state corresponding to one or more semi-persistent cross-link interference resources via a MAC-CE. For example, the network may configure the UE 315-*b* with semi-persistent cross-link interference resources via control signaling (e.g., via the RRC configuration) and the TCI state associated with each of the configured cross-link interference resources may be updated (e.g., dynamically updated) via a MAC-CE, such as a MAC-CE that indicates for one or more of the cross-link interference resources or one or more cross-link interference resource sets (e.g., lists) to be activated or deactivated. Additionally. or alternatively, the network may configure a TCI state corresponding to one or more semi-persistent cross-link interference resources via a DCI. For example, the network may configure the UE 315-*b* with cross-link interference resources (or cross-link interference resources sets) and the corresponding TCI states via control signaling (e.g., via the RRC configuration). In some examples, each cross-link interference resource (or resource set) may be configured with a trigger state that may be indicated (e.g., dynamically indicated, updated) via the DCI.

In some examples, the UE 315-*b* may not be capable of switching to a beam associated with a TCI state of a configured resource. In such an example, the UE 315-*b* may determine a default TCI state (e.g., a default beam) for performing the cross-link interference measurement based on one or more rules (e.g., one or more rules configured by the network). For example, the network may transmit an indication (e.g., a DCI) to configure (e.g., aperiodically) the UE 315-*b* to perform cross-link interference reporting on reference signals transmitted by another UE 315. In such an example, if a scheduling offset between the resources in which the DCI is received by the UE 315-*b* and the resources over which the UE 315-*b* is configured to perform the cross-link interference measurements fails to satisfy a threshold (e.g., fails to exceed a threshold, is relatively shorter than a threshold), the UE 315-*b* may determine to use a default TCI state (e.g., based on one or more rules) for performing the cross-link interference measurements.

The UE 315-*b* may generate a cross-link interference report 340 indicating the cross-link interference measurement for at least one receive beam of the set of receive beams. In some examples, the UE 315-*b* may generate, the cross-link interference report 340 based on the control signaling 335 and a trigger of a cross-link interference measurement. The UE 315-*b* may report the measured cross-link interference to the network entity 305-*a*. For example, the UE 315-*b* may transmit the cross-link interference report 340 (e.g., indicating the measured cross-link interference) to the network entity 305-*a*.

In some examples, the UE 315-*b* may determine to transmit a cross-link interference report based on one or more rules (e.g., an event). For example, the UE 315-*b* may transmit an event triggered report if one or more cross-link interference measurements satisfy a threshold. Additionally, or alternatively, the network may configure the UE 315-*b* with an activation mechanism for semi-persistent cross-link interference reporting. For example, the network may configure (e.g., via RRC signaling) the UE 315 with semi-persistent resources (e.g., one or more lists of semi-persistent resources) for reporting cross-link interference measurements. In such an example, the network may activate (or deactivate) the configured resources via a MAC-CE.

Figure 3B:
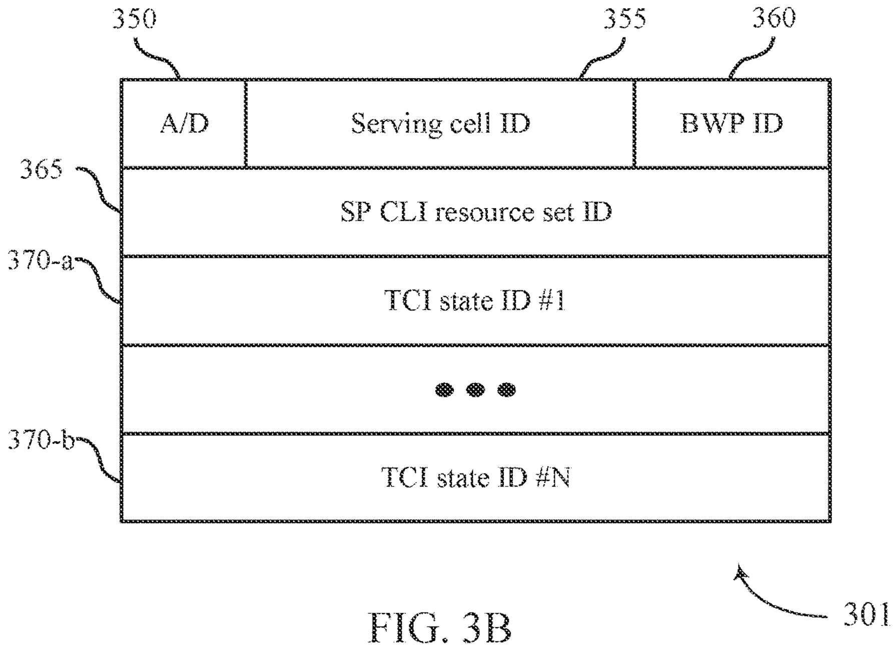
FIG. 3B illustrates an example of a media access control control element (MAC-CE) that supports aspects for cross-link interference measurement in accordance with one or more aspects of the present disclosure.

FIG. 3B illustrates an example of a MAC-CE 301 that supports aspects for cross-link interference measurement in accordance with one or more aspects of the present disclosure. In the example of FIG. 3B, the MAC-CE 301 may be communicated between one or more of the UEs 315 and one or more of the network entities 305, as described with reference to FIG. 3A. For example, the network entity 305-*a* may activate (or deactivate) resources configured for cross-link interference reporting via the MAC-CE 301. In some examples, by activating resources (e.g., semi-persistent resources) via the MAC-CE 301, the network may trigger the UE 315-*b* to transmit a cross-link interference report (e.g., the cross-link interference report 340).

In some examples, the MAC-CE 301 may include an activation or deactivation (A/D) field (e.g., an A/D field 350) that may indicate, to the UE 315-*b*, whether to activate or deactivate semi-persistent resources (e.g., semi-persistent cross-link interference resources) configured for the UE 315-*b* (e.g., via RRC signaling). In some examples, the A/D field 350 may be set to 1 to indicate activation and may be set to 0 (e.g., or another value different from 1) to indicate deactivation. Additionally, or alternatively, the MAC-CE 301 may include a serving cell identifier field (e.g., a serving cell ID field 355), that may indicate an identifier of a serving cell for which the MAC-CE 301 may apply. In some examples, a length of the serving cell ID field 355 may be five bits. Additionally. or alternatively, the MAC-CE 301 may include a BWP ID field 360, that may indicate a downlink field for which the MAC-CE 301 may apply. For example, the BWP ID field 360 may indicate a bandwidth part to be applied as a codepoint (e.g., of a DCI bandwidth part indicator field) to identify a bandwidth part in which the indicated resources (e.g., the frequency resources) may be located. In some examples, the BWP ID field 360 may be two bits.

Additionally, or alternatively, the MAC-CE 301 may include a semi-persistent cross-link interference resource set ID field, (e.g., a SP CLI RS resource set ID field 365) that may include an index of a set of cross-link interference resources (e.g., a cross-link interference resource set) including semi-persistent cross-link interference resources that may be activated or deactivated by the MAC-CE 301 (e.g., based on a value of the A/D field 350). In some examples, the cross-link interference resource set may be a non-zero power cross-link interference resource set including semi-persistent non-zero power cross-link interference resources. In some examples, each cross-link interference resource set (e.g., corresponding to the index provided by an SP CLI resource set ID field 365) may be configured at the UE 315-*b* via a higher layer parameter (e.g., via a NZP-CLI-RS-ResourceSet information element (IE)). For example, the parameter may indicate a set of resources (e.g., non-zero-power cross-link interference resources), respective identifiers of the resources, and one or more set-specific parameters. In some examples, the semi-persistent cross-link interference resource set identifier field, (e.g., the SP CLI-RS resource set ID field 365) may include one or more TCI state ID fields 370 (e.g., a TCI state ID field 370-*a* and a TCI state ID field 370-*b*). Each TCI state ID field 370 may include an identifier that may be used as a QCL source for a resource within the cross-link interference resource set (e.g., corresponding to the index provided by the SP CLI resource set ID field 365). For example, the TCI state ID field 370-*a* may indicate a first TCI state for a first resource of the cross-link interference resource set and the TCI state ID field 370-*b* may indicate a first TCI state for an N-th resource of the cross-link interference resource set. It is to be understood that the names of IEs and fields described herein may change based on implementation of one or multiple devices (e.g., the UEs 315, the network entities 305, or both), and the examples described herein should not be considered limiting to the scope covered by the claims or the disclosure.

Figure 4:
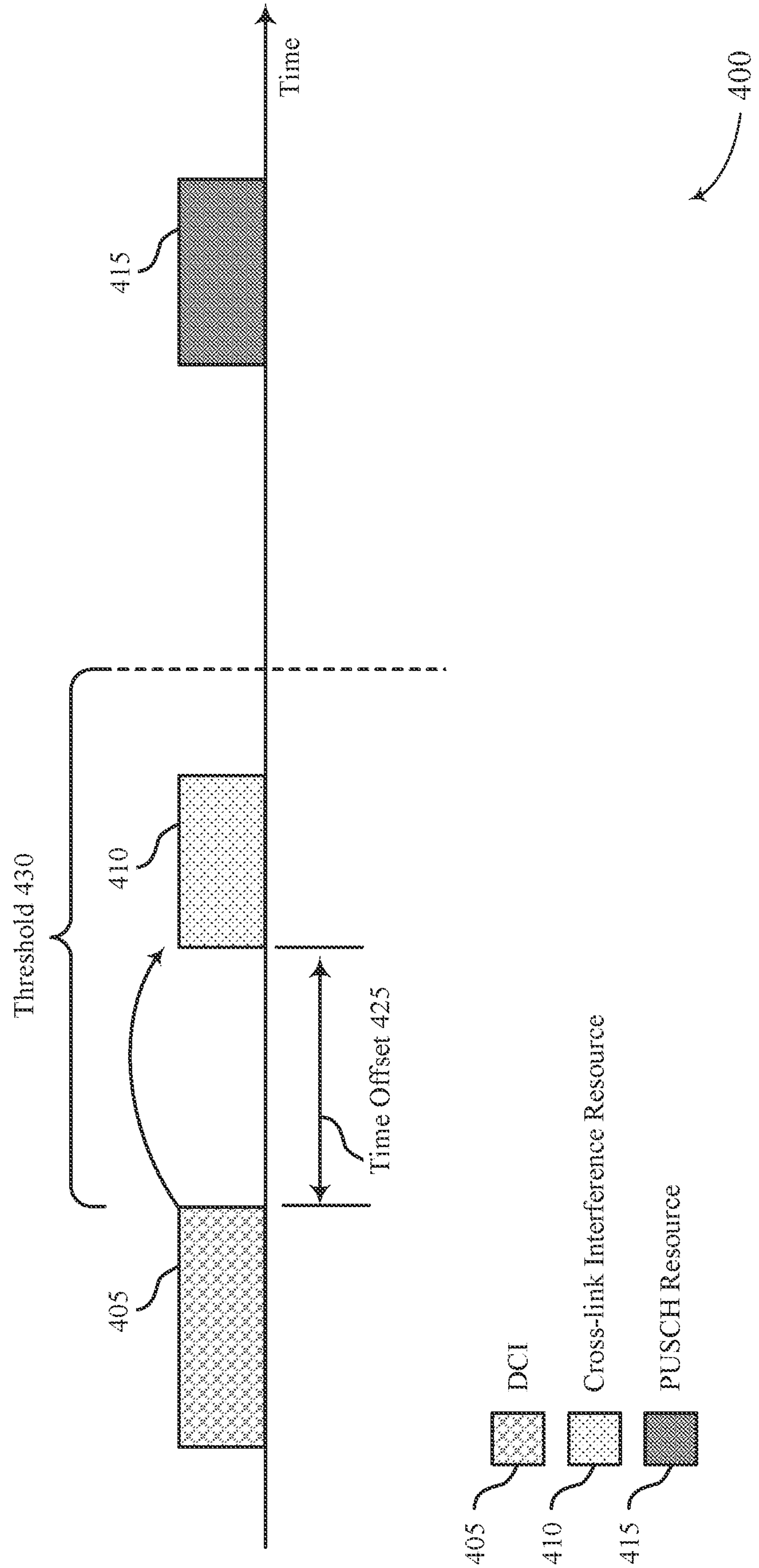
FIGS. 4 through 6 each illustrate an example of a timing diagram that supports aspects for cross-link interference measurement in accordance with one or more aspects of the present disclosure.

FIG. 4 illustrates an example of a timing diagram 400 that supports aspects for cross-link interference measurement in accordance with one or more aspects of the present disclosure. In some examples, the timing diagram 400 may implement or be implemented by one or more aspects of the wireless communications system 100 and the wireless communications system 300. For example, the timing diagram 400 may be implemented by a UE and a network entity, which may be examples of the corresponding devices as described with reference to FIGS. 1, 2, and 3A. In the example of FIG. 4, the network entity may be an example of a CU 160, a DU 165, or an RU 170, a base station 140, an IAB node 104, a transmission-reception point, or one or more other network nodes as described with reference to FIGS. 1, 2, and 3A. The timing diagram 400 may include features for improved communications between the UE and the network, among other benefits.

As illustrated in the example of FIG. 4, the network (e.g., one or more network entities) may configure a communication device (e.g., the UE) to perform cross-link interference measurement and reporting via lower layer (e.g., L1. PHY layer, L2, MAC layer) signaling. In some examples, the network may configure the UE to perform cross-link interference measurement and reporting aperiodically, such a via dynamic signaling (e.g., a DCI). For example, the network may transmit a DCI 405 indicating (e.g., triggering) for the UE to measure and report cross-link interference. In some examples, the DCI 405 may indicate for the UE to measure and report cross-link interference via a field included in the DCI 405, such as a CLI-trigger state field. For example, the CLI-trigger state field may indicate an index of a trigger state for cross-link interference resources that may be configured (e.g., preconfigured) for the UE (e.g., via RRC signaling). In some examples, each trigger state may indicate one or more cross-link interference resources (e.g., a cross-link interference resource 410) over which the UE may perform the cross-link interference measurements. Additionally, or alternatively, the CLI-trigger state field may indicate a type of resource (e.g., periodic resources, semi-persistent resources, or aperiodic resources) that may be used by the UE for reporting the cross-link interference measurements. For example, the network may indicate one or more frequency domain resources, such as physical uplink shared channel (PUSCH) resources. In some examples, the indicated PUSCH resources (e.g., a PUSCH resource 415) may be periodic, semi-persistent, or aperiodic. In some examples, multiple trigger states for performing the cross-link interference measurement may be configured at the UE (e.g., via the RRC signaling) and the DCI 405 may indicate an index (e.g., via the CLI-trigger state field) of a trigger state to be used by the UE, thereby activating a cross-link interference report.

In some examples, the network may indicate a time offset 425 between the DCI 405 and the cross-link interference resource 410. Additionally, or alternatively, the network may indicate another time offset (not shown) between the cross-link interference resource 410 and the PUSCH resource 415 (or other resources over which the cross-link interference may be reported to the network). In some examples, the cross-link interference resources 410 may be associated with a TCI state. For example, the network may indicate a TCI state corresponding to each cross-link interference resource 410 configured for the UE. In such an example, the UE may use the TCI state (e.g., a QCL relationship associated with the TCI state) to determine (e.g., identify, select) abeam for performing the cross-link interference measurements over the corresponding cross-link interference resource 410. For example, in response to receiving an indication to perform cross-link interference measurements over the cross-link interference resource 410 (e.g., via the DCI 405), the UE may switch to a beam (e.g., a receive beam) associated with the TCI state configured for the cross-link interference resource 410 (e.g., to performing the cross-link interference measurements).

In some examples, however, the UE may not be capable of switching to the beam associated with the TCI state of the configured resource (e.g., the cross-link interference resource 410). For example, if the time offset 425 between the DCI 405 and the cross-link interference resource 410 (e.g., the triggered aperiodic cross-link interference resource) fails to satisfy (e.g., fails to exceed) an aperiodic cross-link interference beam switch latency threshold (e.g., a threshold 430), the UE may not be capable of switching to the beam associated with the TCI state of the cross-link interference resource 410. In some examples, the threshold 430 may be based on one or more capabilities of the UE (e.g., a UE capability). For example, the UE may transmit a message, such as UE capability signaling, to the network indicating a threshold offset (e.g., the threshold 430) for an offset between the DCI 405 and an occasion (e.g., the cross-link interference resource 410) indicated by the DCI 405. Additionally, or alternatively, the threshold may have an increased latency, for example if the DCI 405 (e.g., the DCI triggering the cross-link interference measurement and reporting) is associated with a sub-carrier spacing difference from the cross-link interference resource 410 (e.g., the aperiodic cross-link interference resource triggered by the DCI 405).

In some examples, if the time offset 425 fails to satisfy (e.g., fails to exceed) the threshold 430, the UE may determine a default receive beam (e.g., a default TCI state) for performing the cross-link interference measurement based on one or more rules (e.g., configured by the network). In some examples, a rule (e.g., an aperiodic cross-link interference default beam rule) for determining the default receive beam may be a same rule as may be used for determining a default beam for performing channel state information measurements (e.g., for performing channel state information measurements over aperiodic channel state information reference signal resources). In some examples, the UE may be configured to operate in a single transmission-reception point mode. In such examples, if the aperiodic cross-link interference resource (e.g., the cross-link interference resource 410) overlaps (e.g., in time, frequency, or both time and frequency) with a downlink transmission scheduled for the UE (e.g., a known downlink signal) the UE may determine a receive beam based on a QCL relationship (e.g., assumption) of the scheduled downlink transmission. Additionally, or alternatively, the UE may determine a receive beam based on a QCL relationship (e.g., assumption) associated with a control resource set, such as a control resource set associated with a relatively lowest identifier in a relatively last monitored slot.

In some examples, the UE may be configured to operate in a multiple transmission-reception point (mTRP) mode (e.g., a single DCI multiple transmission-reception point mode (sDCI mTRP) or a multiple DCI multiple transmission-reception point mode (mDCI mTRP)), a single frequency network (SFN) mode (e.g., associated with a single frequency network control resource set (CORESET)), or a cross-carrier scheduling mode (e.g., associated with cross-component carrier (cross-CC) scheduling). In some examples, the UE may determine a receive beam based on a same rule as may be used for determining a default beam for performing channel state information measurements (e.g., for performing channel state information measurements over aperiodic channel state information reference signal resources).

In some examples, if the UE is configured to operate in a single DCI multiple transmission-reception point mode, the UE may determine a receive beam based on a TCI state (e.g., a QCL relationship associated with the TCI state) identified by a codepoint (e.g., a TCI state codepoint associated with a relatively lowest identifier) including multiple (e.g., two) TCI states. That is, for single DCI multiple transmission-reception point operations, the UE may determine a receive beam based on a TCI codepoint having a relatively lowest identifier value and that identifies multiple TCI states corresponding to the multiple transmission-reception points.

Additionally, or alternatively, if the UE is configured to operate in a multiple DCI multiple transmission-reception point mode, the UE may determine a receive beam based on a TCI state (e.g., a QCL relationship associated with the TCI state) corresponding to a control resource set (e.g., a relatively latest monitored control resource set) for each of multiple control resource set pools (e.g., sets or groups of control resource sets) configured for the UE (e.g., via a CORESETpool IE). That is, for multiple DCI multiple transmission-reception point operations, the UE may determine a receive beam based on a TCI state associated with a recently (e.g., a most recently) monitored control resource set for each control resource set pool configured at the UE.

Additionally, or alternatively, if the UE is configured to operate in a single frequency network mode (e.g., associated with a single frequency network control resource set) the UE may determine a receive beam based on a TCI state (e.g., a QCL relationship associated with the TCI state) identified by a codepoint, such as a single frequency network TCI state codepoint associated with a relatively lowest identifier. Additionally, or alternatively, if the UE is configured to operate in a cross-carrier scheduling mode, the UE may determine a receive beam based on a TCI state (e.g., a QCL relationship associated with the TCI state) identified by a codepoint, such as a TCI state codepoint associated with a relatively lowest identifier. That is, for single frequency network operations or cross-carrier scheduling operations (or both), the UE may determine a receive beam based on a TCI codepoint having a relatively lowest identifier value. In some examples, by configuring the UE to perform cross-link interference measurement and reporting aperiodically via lower layer signaling, the network may provide one or more enhancements to techniques for cross-link interference measurement and reporting, among other benefits.

Figure 5:
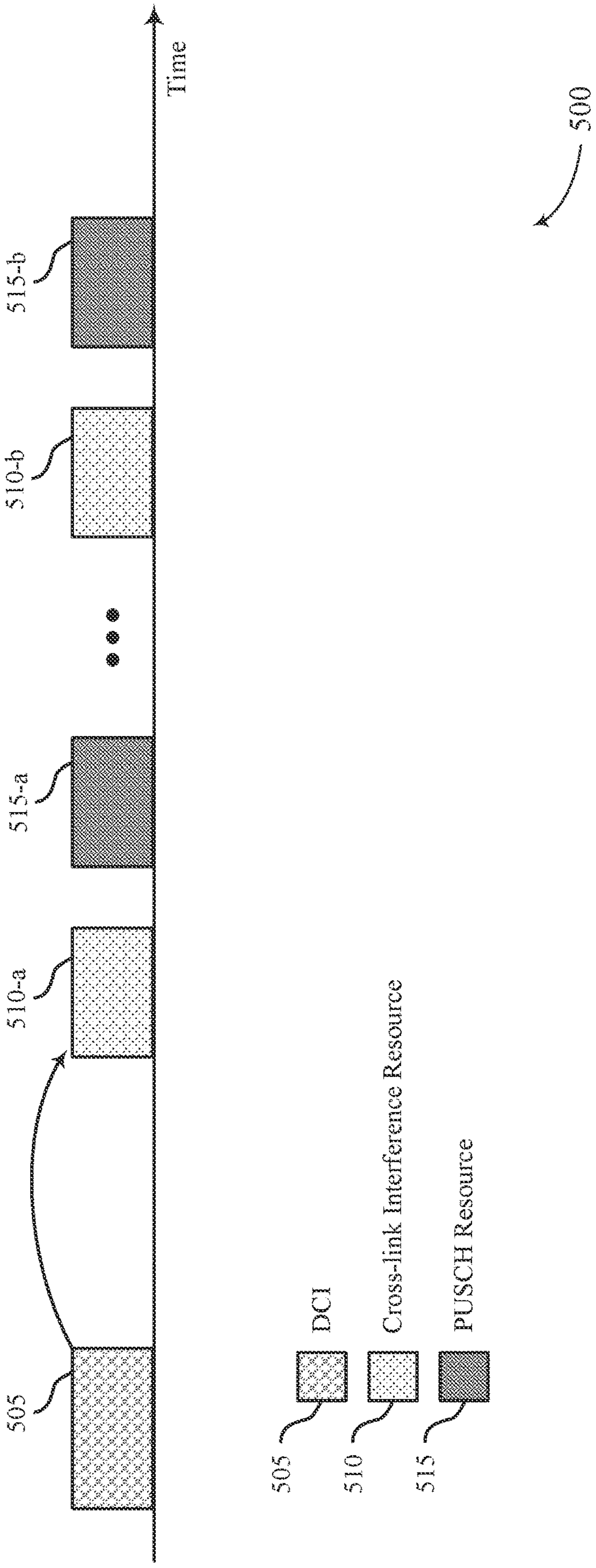

FIG. 5 illustrates an example of a timing diagram 500 that supports aspects for cross-link interference measurement in accordance with one or more aspects of the present disclosure. In some examples, the timing diagram 500 may implement or be implemented by one or more aspects of the wireless communications system 100 and the wireless communications system 300. For example, the timing diagram 500 may be implemented by a UE and a network entity, which may be examples of the corresponding devices as described with reference to FIGS. 1, 2, and 3A. In the example of FIG. 5, the network entity may be an example of the network entity may be an example of a CU 160, a DU 165, or an RU 170, a base station 140, an IAB node 104, a transmission-reception point, or one or more other network nodes as described with reference to FIGS. 1, 2, and 3A. The timing diagram 500 may include features for improved communications between the UE and the network, among other benefits.

In some examples, a network (e.g., one or more network entities) may configure a communication device (e.g., a UE) to perform cross-link interference measurement and reporting semi-persistently. In such examples, the network may configure the UE to transmit a cross-link interference report (e.g., a semi-persistent cross-link interference report) on a physical uplink channel, such as a physical uplink control channel (PUCCH) or a PUSCH. For example, as illustrated in the example of FIG. 5, the network may indicate (e.g., trigger) for the UE to perform semi-persistent cross-link interference reporting over one or more PUSCH resources 515 (e.g., a PUSCH resource 515-*a* or a PUSCH resource 515-*b*) via a DCI 505. That is, the DCI 505 may trigger (e.g., activate) semi-persistent cross-link interference reporting for the UE. In some examples, the cross-link interference report (e.g., the semi-persistent cross-link interference report) may be activated by a DCI which may be scrambled by a radio network temporary identifier (RNTI) configured at the UE for cross-link interference reporting (e.g., indicated to the UE via an SP-CLI-RNTI IE). For example, a semi-persistent cross-link interference request field (e.g., identified by particular field values) may be included in the DCI 505 (e.g., the activation DCI) and the DCI 505 may be scrambled by the RNTI configured at the UE for cross-link interference reporting. In such an example, the semi-persistent cross-link interference request field may activate one or more semi-persistent cross-link interference trigger states of multiple semi-persistent cross-link interference trigger states that may be configured for the UE. For example, the semi-persistent cross-link interference request field may activate one or more semi-persistent cross-link interference trigger states associated with (e.g., linked to) a parameter (e.g., a higher layer parameter of a CLI-ReportConfig IE) that may indicate (e.g., specify) corresponding semi-persistent cross-link interference resources (e.g., a cross-link interference resource 510-*a* and a cross-link interference resource 510-*b*) and a report configuration (e.g., a cross-link interference report configuration).

Additionally or alternatively, the network may activate (e.g., trigger) semi-persistent cross-link interference reporting over one or more the PUSCH resources 515 (e.g., the PUSCH resource 515-*a* or the PUSCH resource 515-*b*) by configure the UE with a semi-persistent cross-link interference trigger state of a same list as may be used to indicate semi-persistent channel state information trigger state. That is, the network may use common signaling to trigger the UE for semi-persistent cross-link interference reporting and channel state information reporting. In such an example, the DCI 505 (e.g., the triggering DCI) may be scrambled using a same RNTI as may be used for scrambling a DCI used to trigger channel state information reporting.

In some examples, if the DCI 505 (e.g., the triggering DCI) is scrambled using a same RNTI as may be used for scrambling the DCI that triggers channel state information reporting, the semi-persistent cross-link interference trigger state may be indicated via a same field as may be used to indicate a semi-persistent channel state information trigger state. For example, a common trigger state field (e.g., corresponding to a same list of trigger states configured for the UE) may be used to indicate both the semi-persistent cross-link interference trigger state and a semi-persistent channel state information trigger state. In other examples, the trigger state field used to indicate the semi-persistent cross-link interference trigger state may be different from the trigger state field used to indicate the semi-persistent channel state information trigger state. For example, the DCI 505 may include a semi-persistent cross-link interference trigger state field and a semi-persistent channel state information trigger state field (e.g., that may correspond to the same list of trigger states configured at the UE). Additionally or alternatively, if the DCI 505 (e.g., the triggering DCI) is scrambled using a same RNTI as may be used for scrambling the DCI that triggers channel state information reporting, the semi-persistent cross-link interference trigger state may be indicated via a trigger state field different from a trigger state field used to indicate a semi-persistent channel state information trigger state. In some examples, by configuring the UE to perform cross-link interference measurement and reporting semi-persistently via lower layer signaling, the network may provide one or more enhancements to techniques for cross-link interference measurement and reporting, among other benefits.

Figure 6:
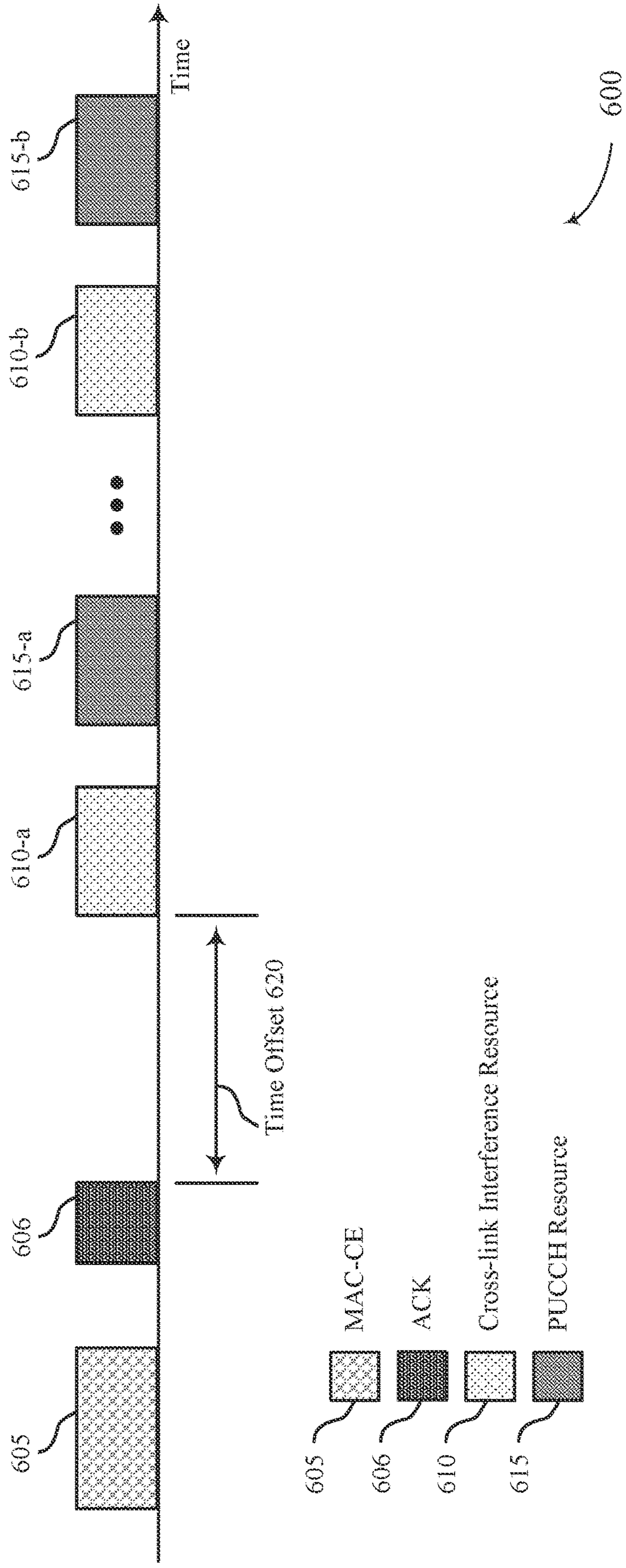

FIG. 6 illustrates an example of a timing diagram 600 that supports aspects for cross-link interference measurement in accordance with one or more aspects of the present disclosure. In some examples, the timing diagram 600 may implement or be implemented by one or more aspects of the wireless communications system 100 and the wireless communications system 300. For example, the timing diagram 600 may be implemented by a UE and a network entity, which may be examples of the corresponding devices as described with reference to FIGS. 1 and 3A. In the example of FIG. 6, the network entity may be an example of a CU 160, a DU 165, or an RU 170, a base station 140, an IAB node 104, a transmission-reception point, or one or more other network nodes as described with reference to FIG. 1. The timing diagram 600 may include features for improved communications between the UE and the network, among other benefits.

As illustrated in the example of FIG. 6, the network may indicate (e.g., trigger) for the UE to perform semi-persistent cross-link interference reporting over one or more PUCCH resources 615 (e.g., a PUCCH resource 615-*a* or a PUCCH resource 615-*b*) via a MAC-CE 605. For example, the MAC-CE 605 (e.g., an activation MAC-CE) may activate (or deactivate) a set of a set of cross-link interference report configuration identifiers (e.g., indicated via a CLI-ReportConfig IE) that may be suitable for (e.g., applicable to) semi-persistent cross-link interference reporting. In some examples, such cross-link interference reporting may occur (e.g., take effect) subsequent to (e.g., after about 3 ms) an acknowledgment message (e.g., an ACK 606) transmitted by the UE (e.g., in response to receiving the MAC-CE 605). For example, cross-link interference resources (e.g., a cross-link interference resource 610-*a* and a cross-link interference resource 610-*b*) may be activated by the MAC-CE 605 and may occur subsequent to a time offset 620 that may be measured from an end time of a slot including the ACK 606.

In some examples, the network may activate semi-persistent cross-link interference reporting on the PUCCH via a MAC-CE dedicated for cross-link interference reporting. For example, the MAC-CE 605 may be different from a MAC-CE used to activate semi-persistent channel state information reporting. That is, a MAC-CE type used for triggering cross-link interference reporting may be different from a MAC-CE type used for triggering channel state information reporting. Additionally, or alternatively, the network may activate semi-persistent cross-link interference reporting on the PUCCH via a same MAC-CE as may be used to activate semi-persistent channel state information reporting. In such an example, a configuration (e.g., indicate via a CLI-ReportConfig IE) used to configure the UE with parameters for cross-link interference reporting and a configuration (e.g., indicate via a CSI-ReportConfig IE) used to configure the UE with parameters for channel state information reporting may share a same identifier space. For example, resources for semi-persistent cross-link interference reporting and resources for semi-persistent channel state information report may be configured via a same list of resource set identifiers. That is, the MAC-CE 605 may include a resource set identifier field (e.g., a semi-persistent cross-link interference resource set identifier field or a semi-persistent channel state information reference signal resource set identifier field) that may include an index of a resource set (e.g., a resource set of multiple resources sets included in a list configured for the UE) and that resource set may correspond to a cross-link interference resource set (e.g., an NZP-CLI-ResourceSet IE), a channel state information reference signal resource set (e.g., an NZP-CSI-RS-ResourceSet IE), or a channel state information interference measurement resource set (e.g., an CSI-IM-ResourceSet IE).

The cross-link interference resource set may be an example of a cross-link interference resource set as described with reference to FIG. 3B. For example, the cross-link interference resource set may include resources (e.g., non-zero power cross-link interference resource) for performing cross-link interference measurements. Additionally, or alternatively, the channel state information reference signal resource set may be an example of a channel state information reference signal resource set as described with reference to FIG. 3B. For example, the channel state information reference signal resource set may include non-zero power channel state information reference signal resources. Additionally, or alternatively, the channel state information interference measurement resource set may be an example of a channel state information interference measurement resource set as described with reference to FIG. 3B. For example, the channel state information interference measurement resource set may include channel state information interference measurement resources.

Figure 7:
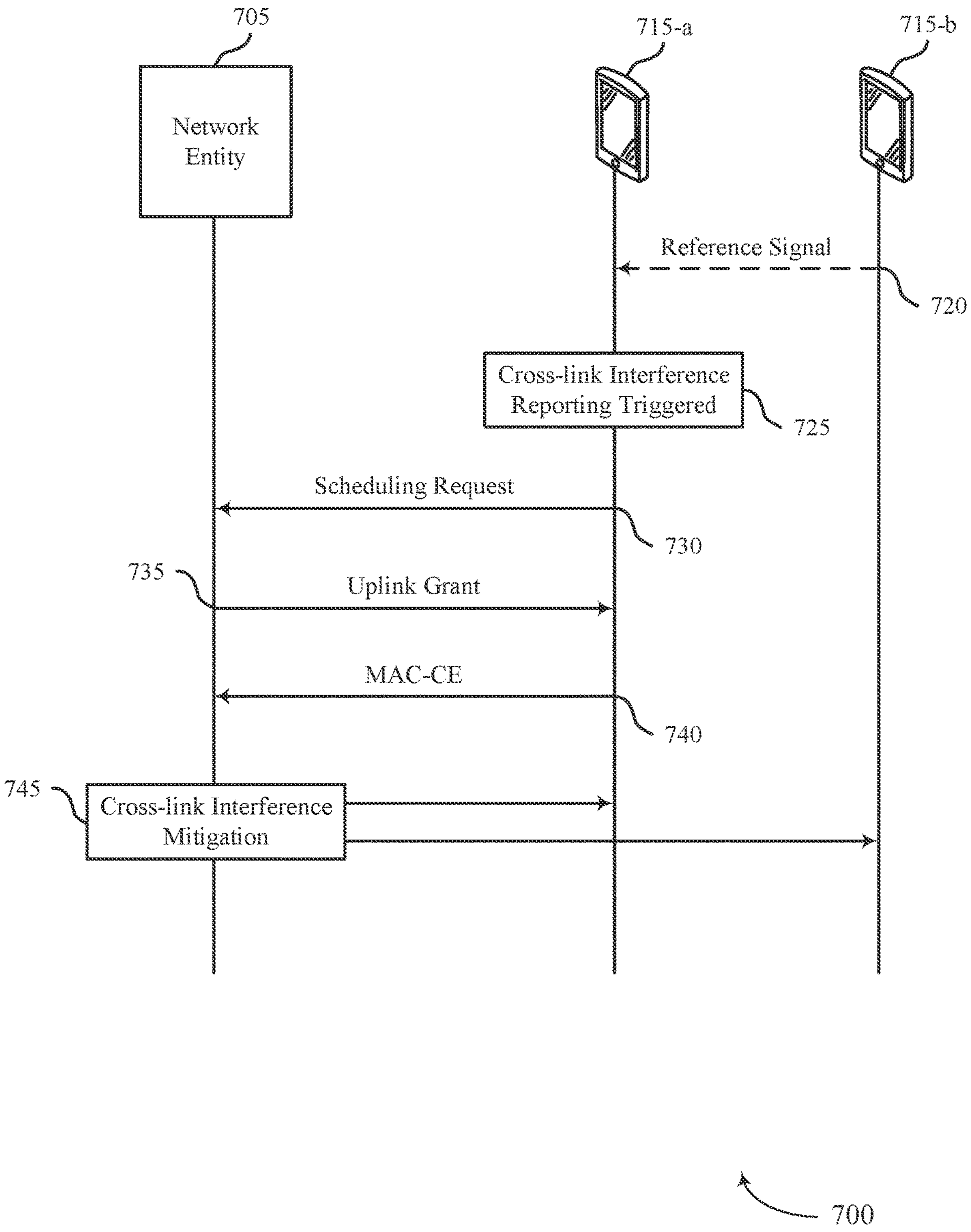
FIGS. 7 and 8 each illustrate an example of a process flow that supports aspects for cross-link interference measurement in accordance with one or more aspects of the present disclosure.

FIG. 7 illustrates an example of a process flow 700 that supports aspects for cross-link interference measurement in accordance with one or more aspects of the present disclosure. The process flow 700 may implement or be implemented by one or more aspects of the wireless communications system 100 and the wireless communications system 300. For example, the process flow 700 may include a network entity 705 and one or more UEs 715 (e.g., a UE 715-*a* and a UE 715-*b*), which may be examples of the corresponding devices as described with reference to FIGS. 1, 2, and 3A. The process flow 700 may be implemented by the network entity 705, the UEs 715, or both. In the following description of the process flow 700, operations between the network entity 705 and the UEs 715 may occur in a different order or at different times than as shown. Some operations may also be omitted from the process flow 700, and other operations may be added to the process flow 700. The process flow 700 may include features for improved communications between the UEs 715 and the network, among other benefits.

In some examples, the UE 715-*a* may be configured to transmit a cross-link interference report based on one or more rules (e.g., an event). That is, cross-link interference reporting, such as higher layer cross-link interference reporting or lower layer cross-link interference reporting, may be event triggered. For higher layer cross-link interference reporting (e.g., L3 cross-link interference reporting), the UE 715-*a* may be configured with resources (e.g., periodic resources) for performing cross-link interference measurements on reference signals (e.g., SRSs) transmitted from other UEs. In such an example, if a value of a measured metric (e.g., a measured cross-link inference metric, an RSRP metric, an RSSI metric) of a resource in the resource list satisfies a threshold (e.g., exceeds a threshold, fails to exceed a threshold) the UE 715-*a* may determine to report the measured cross-link interference metric.

In some examples, the UE 715-*a* may be triggered to transmit a report (or multiple reports) indicating multiple cross-link interference metrics (e.g., corresponding to multiple cross-link interference measurements) collected over a time duration. In some examples, the time duration may start based on an entering condition being satisfied: The entering condition may be satisfied (e.g., reporting may be triggered to begin) if the measured cross-link interference metric satisfies a threshold (e.g., exceeds a threshold, fails to exceed a threshold). In some examples, the UE 715-*a* may account for hysteresis of the system prior to determining whether the cross-link interference metric satisfies the threshold. For example, the UE 715-*a* may subtract a value corresponding to one or more previous measurements (e.g., hysteresis) from the cross-link interference metric prior to comparing the cross-link interference metric to the threshold. In some examples, the time duration may end based on an leaving (e.g., exiting) condition being satisfied: The leaving condition may be satisfied (e.g., reporting may be triggered to end) if the measured cross-link interference metric fails to satisfy a threshold (e.g., fails to exceed a threshold). In some examples, the UE 715-*a* may account for hysteresis of the system prior to determining whether the cross-link interference metric satisfies the threshold. For example, the UE 715-*a* may add a value corresponding to the one or more previous measurements (e.g., hysteresis) to the cross-link interference metric prior to comparing the cross-link interference metric to the threshold.

In some examples, the network may configure the UE 715-*a* with one or more parameters for cross-link interference reporting. For example, the network may configure the UE 715-*a* with a timeToTrigger parameter indicating a time duration between a time in which the entering condition may be satisfied and a time in which the cross-link interference report may be transmitted. Additionally, or alternatively, the network may configure the UE 715-*a* with a reportedMetric parameter indicating a cross-link interference metric (e.g., RSRP, RSSI) to be indicated in the cross-link interference report. Additionally, or alternatively, the network may configure the UE 715-*a* with a maxReportCLI parameter indicating a quantity of cross-link interference measurements (or cross-link interference metrics) to be indicated via the cross-link interference report. In some examples, if the quantity of cross-link measurements satisfying the threshold is relatively higher than a value of the maxReportCLI parameter, the UE 715-*a* may determine to report a quantity of cross-link interference measurements equal to the value of the maxReportCLI parameter. In some examples, the UE 715-*a* may be configured to select the quantity of cross-link interference metrics (e.g., to be indicated via the cross-link interference report) based on respective values of each cross-link interference measurement (e.g., satisfying the threshold).

Additionally, or alternatively, the network may configure the UE 715-*a* with a reportInterval parameter indicating a periodicity at which cross-link interference reports may be transmitted by the UE 715-*a* (e.g., over a duration between the entering condition being satisfied and the leaving condition being satisfied). Additionally, or alternatively, the network may configure the UE 715-*a* with a reportAmount parameter indicating a quantity of reports that may be transmitted (e.g., over a duration between the entering condition being satisfied and the leaving condition being satisfied). Additionally, or alternatively, the network may configure the UE 715-*a* with a reportOnLeave metric indicating whether a report may be transmitted in response to the leaving condition being satisfied.

In some examples of lower layer cross-link interference reporting (e.g., L2 cross-link interference reporting, L1 cross-link interference reporting), the UE 715-*b* may be configured with cross-link interference resources (e.g., periodic resources, semi-persistent resources, aperiodic resources) for event triggered cross-link interference reporting. That is, the network may configure the UE 715-*a* with one or more parameters for event triggered cross-link interference reporting. The parameters for event triggered cross-link interference reporting may, in some examples, be common to both cross-link interference reporting and channel state information reporting. For example, the network may configure the UE 715-*a* with a parameter indicating for the UE 715-*a* to report a cross-link interference metric, such as an RSRP metric (e.g., indicated via a L1-SRS-RSRP IE) or an RSSI metric (e.g., indicated via a L1-CLI-RSSI IE) via the cross-link interference report.

As illustrated in the example of FIG. 7, the UE 715-*a* may report cross-link interference based on a trigger. For example, the UE 715-*a* may be configured with resources (e.g., periodic resources, semi-persistent resources, or aperiodic resources) for performing cross-link interference measurements on reference signals (e.g., SRSs) transmitted from other UEs, such as the UE 715-*b*. In such an example, if a value of the measured cross-link interference (e.g., a value of the cross-link interference metric) satisfies a threshold (e.g., exceeds a threshold, fails to exceed a threshold) the UE 715-*a* may determine to report the cross-link interference measurement. For example, the UE 715-*a* may perform a cross-link interference measurement on a reference signal transmitted from the UE 715-*b* at 720. A value of a cross-link interference metric corresponding to the cross-link interference measurement may satisfy the threshold (e.g., exceed a threshold, fail to exceed a threshold). Therefore, at 725, cross-link interference reporting may be triggered for the UE 715-*a*.

In some examples (e.g., once triggered), the UE 715-*a* may transmit the cross-link interference report via lower layer signaling. For example, the UE 715-*a* may transmit the cross-link interference report as uplink control information on periodic or semi-persistent resources (e.g., periodic or semi-persistent resources dedicated for cross-link interference reporting). In some examples, if the UE 715-*a* reports the cross-link interference report as uplink control information, the UE 715-*a* may determine whether to transmit the cross-link interference report with (or without) a channel state information report, for example based on a respective priority of the cross-link interference report and the channel state information report. Additionally, or alternatively, the UE 715-*a* may transmit the cross-link interference report via a MAC-CE in an uplink grant (e.g., over resources indicated via an uplink grant) requested by the UE 715-*a* via a scheduling request. For example, at 730, in response to cross-link interference reporting being triggered, the UE 715-*a* may transmit a scheduling request to the network entity 705. At 735, the UE 715-*a* may receive an uplink grant scheduling resources over which the UE 715-*a* may transmit a report indicating the cross-link interference metric.

At 745, the network entity 705 may perform one or more cross-link interference mitigation techniques based on receiving the cross-link interference report (e.g., via the MAC-CE transmitted at 740). For example, the network entity 705 may indicate for the UE 715-*a* (or the UE 715-*b*) to perform beam switching, such that cross-link interference experienced by the UE 715-*a* (e.g., due to uplink transmission from the UE 715-*b*) may be reduced. Additionally, or alternatively, the network may schedule downlink transmissions for the UE 715-*a* and uplink transmission for the UE 715-*b*, such that the downlink transmission and the uplink transmissions may be non-overlapping, thereby reducing cross-link interference at the UE 715-*b*. In some examples, the network entity 705 may adjust TDM operations performed at the UE 715-*a* (or the UE 715-*b*), such that cross-link interference at the UE 715-*a* may be reduced.

Figure 8:
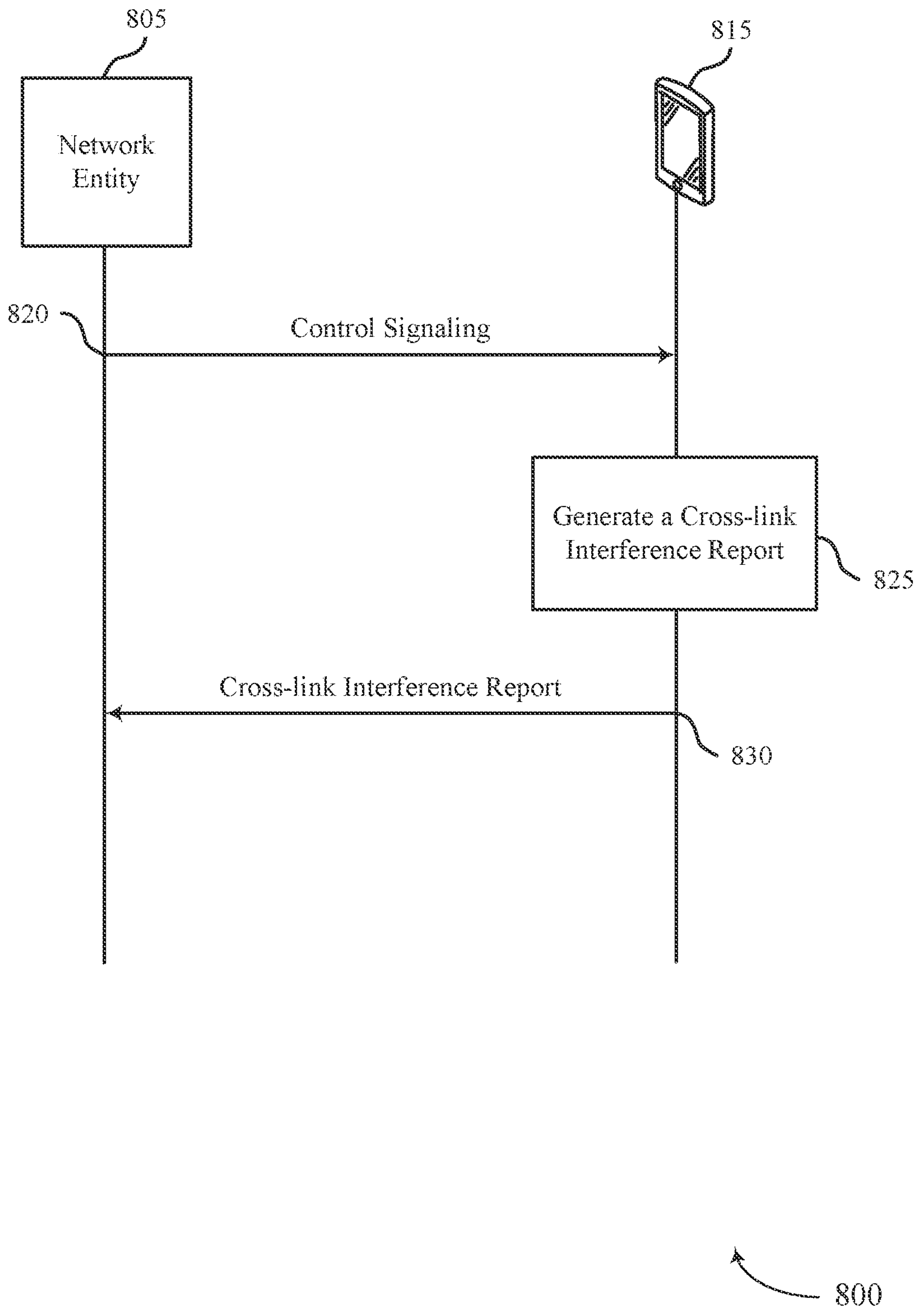

FIG. 8 illustrates an example of a process flow 800 that supports aspects for cross-link interference measurement in accordance with one or more aspects of the present disclosure. The process flow 800 may implement or be implemented by one or more aspects of the wireless communications system 100 and the wireless communications system 300. For example, the process flow 800 may include a network entity 805 and a UE 815, which may be examples of the corresponding devices as described with reference to FIGS. 1 and 3A. The process flow 800 may be implemented by the network entity 805, the UE 815, or both. In the following description of the process flow 800, operations between the network entity 805 and the UE 815 may occur in a different order or at different times than as shown. Some operations may also be omitted from the process flow 800, and other operations may be added to the process flow 800. The process flow 800 may include features for improved communications between the UE 815 and the network, among other benefits.

At 820, the UE 815 may receive control signaling indicating a set of cross-link interference measurement occasions (e.g., cross-link interference resources) and a set of receive beams associated with the set of cross-link interference measurement occasions. In some examples, the trigger may be an example of a trigger as described with reference to FIGS. 3 through 5. For example, the cross-link interference measurement occasions may be periodic cross-link interference resources. As such, the UE 815 may be triggered to transmit a cross-link interference report based on cross-link interference occasions included in the set. Additionally, or alternatively, the cross-link interference measurement occasions may be aperiodic cross-link interference resources indicated to the UE 815 via a DCI. In such an example, the UE 815 may be triggered to transmit a cross-link interference report based on the DCI. Additionally, or alternatively, the cross-link interference measurement occasions may be semi-persistent cross-link interference resources indicated to the UE 815 via a DCI scrambled with an RNTI for cross-link interference reporting (e.g., configured for the UE 815 by the network). In such an example, the UE 815 may be triggered to transmit a cross-link interference report based on the DCI. Additionally, or alternatively, the cross-link interference measurement occasions may be semi-persistent cross-link interference resources indicated to the UE 815 via a MAC-CE. In such an example, the UE 815 may be triggered to transmit a cross-link interference report based on the MAC-CE.

At 825, the UE 815 may generate a cross-link interference report based on the control signaling and a trigger of a cross-link interference measurement. In some examples, the cross-link interference report may indicate the cross-link interference measurement for at least one receive beam of the set of receive beams. At 830, the UE 815 may transmit the cross-link interference report to the network entity 805. In some examples, the UE 815 may transmit the cross-link interference report on an uplink control channel (e.g., a PUCCH), for example via an uplink control information message. Additionally, or alternatively, the UE 815 may transmit the cross-link interference report on an uplink shared channel (e.g., a PUSCH). For example, the UE 815 may transmit the cross-link interference report on the physical uplink shared channel in response to transmitting a scheduling request.

Figure 9:
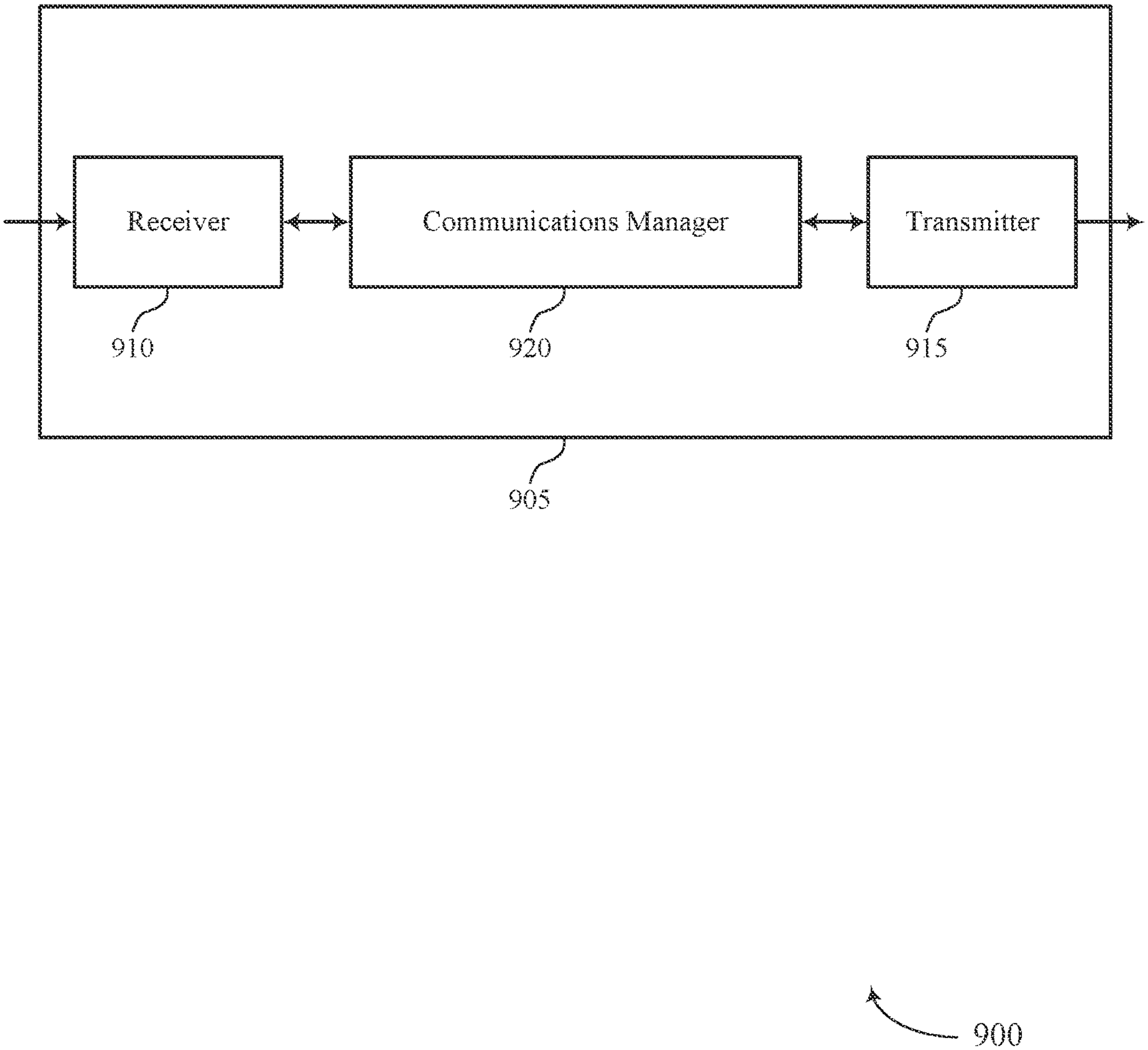
FIGS. 9 and 10 show block diagrams of devices that support aspects for cross-link interference measurement in accordance with one or more aspects of the present disclosure.

FIG. 9 shows a block diagram 900 of a device 905 that supports aspects for cross-link interference measurement in accordance with one or more aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to aspects for cross-link interference measurement). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to aspects for cross-link interference measurement). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of aspects for cross-link interference measurement as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a UE (e.g., the device 905) in accordance with examples as disclosed herein. For example, the communications manager 920 may be configured as or otherwise support a means for receiving control signaling indicating a set of cross-link interference measurement occasions and a set of receive beams associated with the set of cross-link interference measurement occasions. The communications manager 920 may be configured as or otherwise support a means for generating, based on the control signaling and a trigger of a cross-link interference measurement, a cross-link interference report indicating the cross-link interference measurement for at least one receive beam of the set of receive beams. The communications manager 920 may be configured as or otherwise support a means for transmitting, to a network entity, the cross-link interference report.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for reduced processing and more efficient utilization of communication resources.

Figure 10:
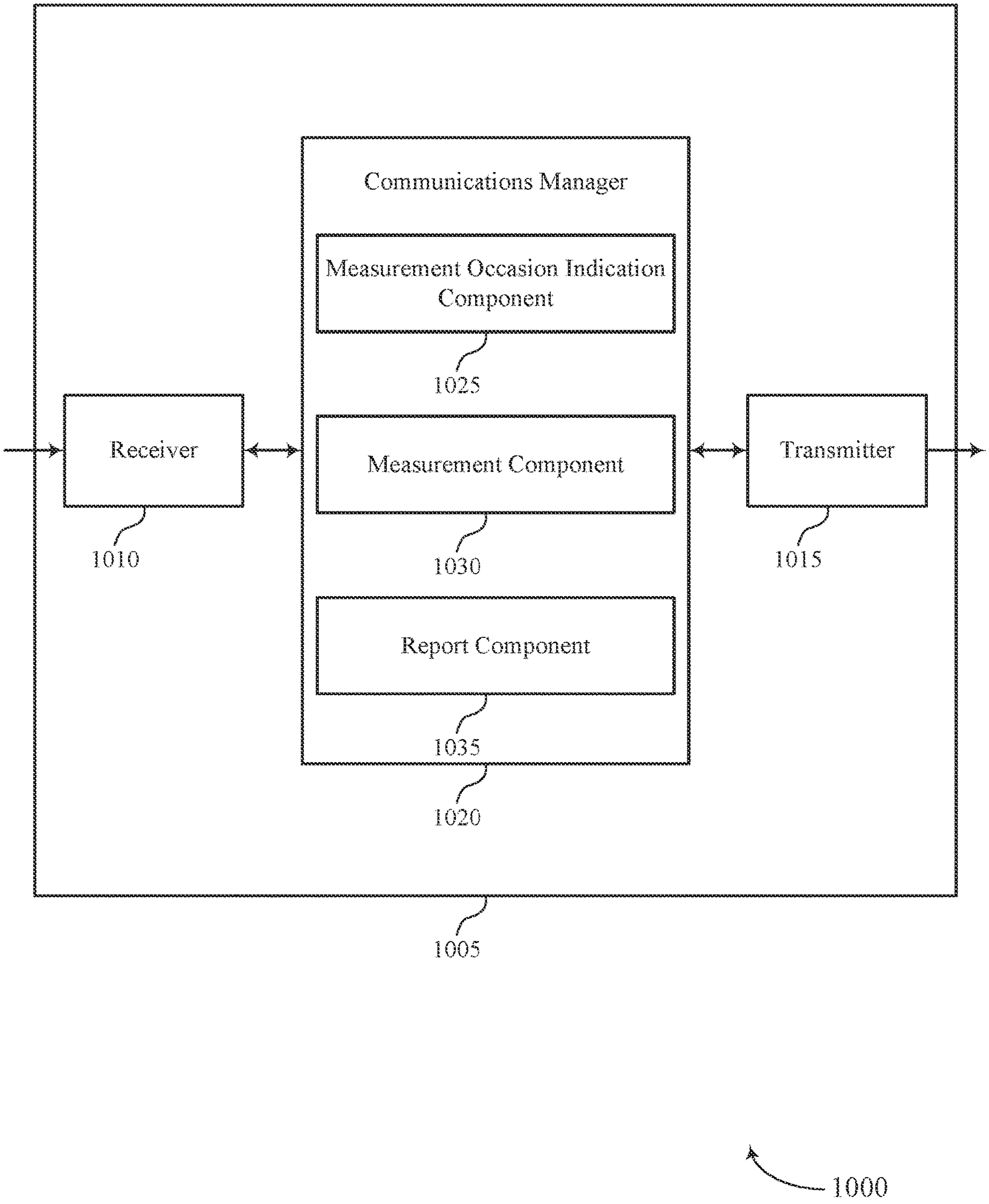

FIG. 10 shows a block diagram 1000 of a device 1005 that supports aspects for cross-link interference measurement in accordance with one or more aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to aspects for cross-link interference measurement). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to aspects for cross-link interference measurement). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of aspects for cross-link interference measurement as described herein. For example, the communications manager 1020 may include a measurement occasion indication component 1025, a measurement component 1030, a report component 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a UE (e.g., the device 1005) in accordance with examples as disclosed herein. The measurement occasion indication component 1025 may be configured as or otherwise support a means for receiving control signaling indicating a set of cross-link interference measurement occasions and a set of receive beams associated with the set of cross-link interference measurement occasions. The measurement component 1030 may be configured as or otherwise support a means for generating, based on the control signaling and a trigger of a cross-link interference measurement, a cross-link interference report indicating the cross-link interference measurement for at least one receive beam of the set of receive beams. The report component 1035 may be configured as or otherwise support a means for transmitting, to a network entity, the cross-link interference report.

Figure 11:
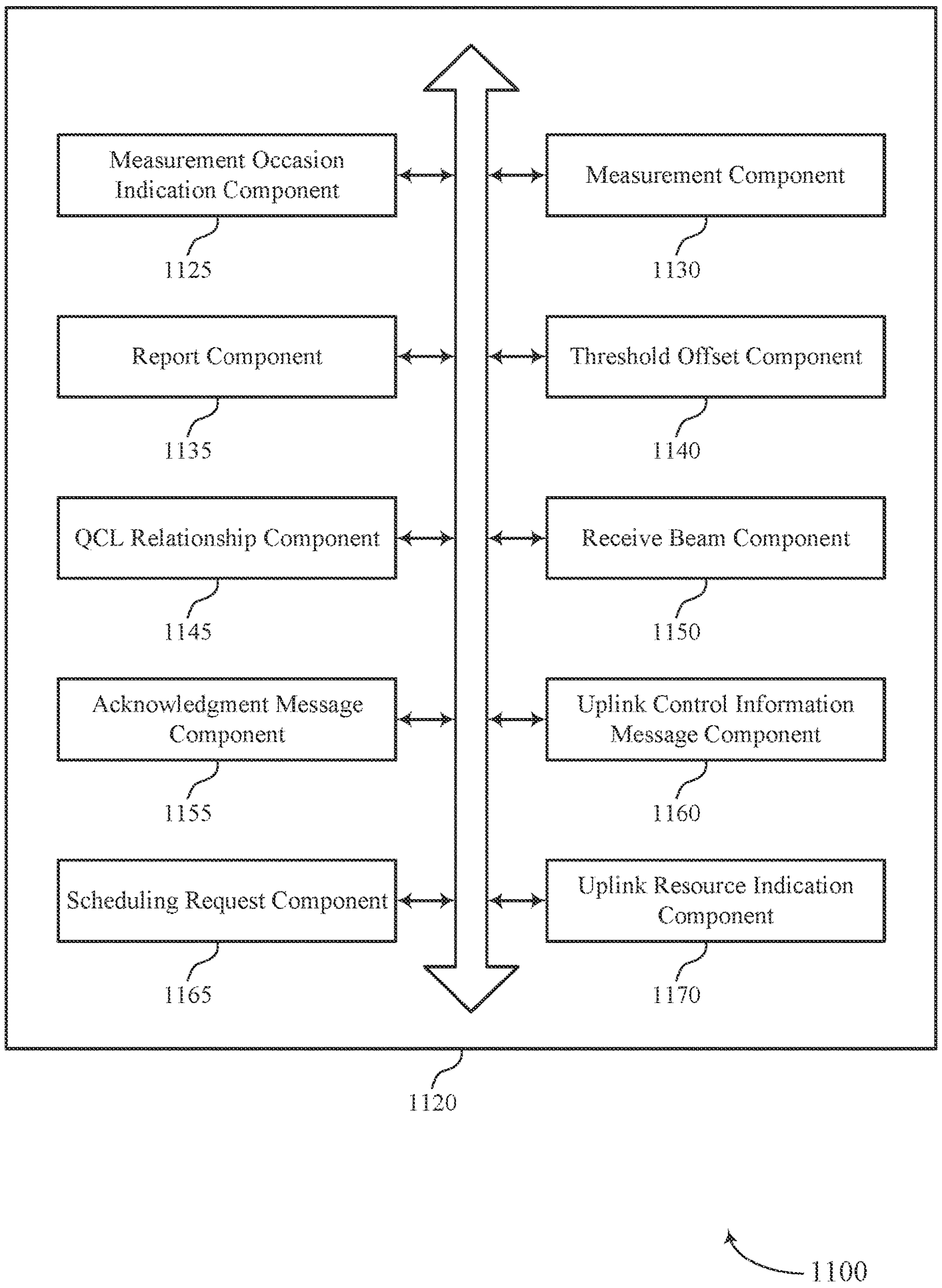
FIG. 11 shows a block diagram of a communications manager that supports aspects for cross-link interference measurement in accordance with one or more aspects of the present disclosure.

FIG. 11 shows a block diagram 1100 of a communications manager 1120 that supports aspects for cross-link interference measurement in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of aspects for cross-link interference measurement as described herein. For example, the communications manager 1120 may include a measurement occasion indication component 1125, a measurement component 1130, a report component 1135, a threshold offset component 1140, a QCL relationship component 1145, a receive beam component 1150, an acknowledgment message component 1155, an uplink control information message component 1160, a scheduling request component 1165, an uplink resource indication component 1170, or any combination thereof. Each of these components may communicate, directly or indirectly, with one another (e.g., via one or more buses).

The communications manager 1120 may support wireless communication at a UE in accordance with examples as disclosed herein. The measurement occasion indication component 1125 may be configured as or otherwise support a means for receiving control signaling indicating a set of cross-link interference measurement occasions and a set of receive beams associated with the set of cross-link interference measurement occasions. The measurement component 1130 may be configured as or otherwise support a means for generating, based on the control signaling and a trigger of a cross-link interference measurement, a cross-link interference report indicating the cross-link interference measurement for at least one receive beam of the set of receive beams. The report component 1135 may be configured as or otherwise support a means for transmitting, to a network entity, the cross-link interference report.

In some examples, the measurement component 1130 may be configured as or otherwise support a means for performing, at an occasion of the set of cross-link interference measurement occasions, a cross-link interference measurement procedure to generate the cross-link interference measurement using a receive beam of the set of receive beams that corresponds to the occasion, where the trigger includes the occasion.

In some examples, the measurement occasion indication component 1125 may be configured as or otherwise support a means for receiving a DCI message indicating an occasion of the set of cross-link interference measurement occasions and a receive beam corresponding to the occasion. In some examples, the measurement component 1130 may be configured as or otherwise support a means for performing, at the occasion, a cross-link interference measurement procedure to generate the cross-link interference measurement using the receive beam, where the trigger includes the occasion indicated by the DCI message. In some examples, the DCI message is scrambled with an RNTI that indicates the UE to generate the cross-link interference measurement, the cross-link interference report transmitted on an uplink shared channel.

In some examples, to support receiving the control signaling indicating the set of cross-link interference measurement occasions and the set of receive beams associated with the set of cross-link interference measurement occasions, the measurement occasion indication component 1125 may be configured as or otherwise support a means for receiving a MAC-CE indicating the set of cross-link interference measurement occasions and the set of receive beams: and the method further includes. In some examples, to support receiving the control signaling indicating the set of cross-link interference measurement occasions and the set of receive beams associated with the set of cross-link interference measurement occasions, the measurement component 1130 may be configured as or otherwise support a means for performing, at an occasion of the set of cross-link interference measurement occasions, a cross-link interference measurement procedure to generate the cross-link interference measurement using a receive beam of the set of receive beams that corresponds to the occasion, where the trigger includes the occasion indicated by the MAC-CE.

In some examples, the acknowledgment message component 1155 may be configured as or otherwise support a means for transmitting an acknowledgment message responsive to the MAC-CE, where the cross-link interference report is transmitted on an uplink control channel according to at least an offset from transmitting the acknowledgment message. In some examples, the measurement component 1130 may be configured as or otherwise support a means for performing a cross-link interference measurement procedure to generate the cross-link interference measurement based on the UE detecting an event, where the event includes the trigger. In some examples, to support transmitting the cross-link interference report, the uplink control information message component 1160 may be configured as or otherwise support a means for transmitting, on an uplink control channel, an uplink control information message that includes the cross-link interference report.

In some examples, the scheduling request component 1165 may be configured as or otherwise support a means for transmitting a scheduling request to the network entity. In some examples, the uplink resource indication component 1170 may be configured as or otherwise support a means for receiving control signaling indicating uplink resources of a shared channel in response to the scheduling request, where transmitting the cross-link interference report includes transmitting, on the uplink resources of the shared channel, a MAC-CE including the cross-link interference report.

In some examples, the at least one receive beam includes a default receive beam, and the threshold offset component 1140 may be configured as or otherwise support a means for selecting the default receive beam for the cross-link interference measurement based on an offset between a DCI message and an occasion indicated by the DCI message for the cross-link interference measurement being less than a threshold offset, where the default receive beam is different than a second receive beam of the set of receive beams that is associated with the occasion.

In some examples, the threshold offset component 1140 may be configured as or otherwise support a means for transmitting, to the network entity, UE capability signaling indicating the threshold offset. In some examples, the threshold offset includes a first offset value and a second offset value. In some examples, the second offset value is based on whether the DCI message and the occasion indicated by the DCI message are associated with a same subcarrier spacing.

In some examples, the QCL relationship component 1145 may be configured as or otherwise support a means for identifying a QCL relationship for a downlink signal received at the UE, where the network entity communicates with the UE via a single transmission-reception point. In some examples, the measurement component 1130 may be configured as or otherwise support a means for performing, at an occasion of the set of cross-link interference measurement occasions, a measurement procedure to generate the cross-link interference measurement using the QCL relationship based on the downlink signal overlapping the occasion.

In some examples, the QCL relationship component 1145 may be configured as or otherwise support a means for identifying a first QCL relationship for a downlink signal received at the UE, where the network entity communicates with the UE via a single transmission-reception point. In some examples, the measurement component 1130 may be configured as or otherwise support a means for performing, at an occasion of the set of cross-link interference measurement occasions, a measurement procedure to generate the cross-link interference measurement using a second QCL relationship associated with a lowest control resource set identifier based on the downlink signal not overlapping the occasion.

In some examples, for single DCI message operation with a set of multiple transmission-reception points, the receive beam component 1150 may be configured as or otherwise support a means for selecting the at least one receive beam of the set of receive beams for the cross-link interference measurement based on a transmission configuration indicator codepoint having a lowest identifier value and that identifies a set of multiple transmission configuration indicator states corresponding to the set of multiple transmission-reception points.

In some examples, for multiple DCI message operation for a set of multiple transmission-reception points, the receive beam component 1150 may be configured as or otherwise support a means for selecting the at least one receive beam of the set of receive beams for the cross-link interference measurement based on a transmission configuration indicator state associated with a most recently monitored control resource set for each control resource set pool. In some examples, for single frequency network operation, the receive beam component 1150 may be configured as or otherwise support a means for selecting the at least one receive beam of the set of receive beams for the cross-link interference measurement based on a transmission configuration indicator codepoint having a lowest identifier value. In some examples, for cross-carrier scheduling operation, the receive beam component 1150 may be configured as or otherwise support a means selecting the at least one receive beam of the set of receive beams for the cross-link interference measurement based on a transmission configuration indicator codepoint having a lowest identifier value.

Figure 12:
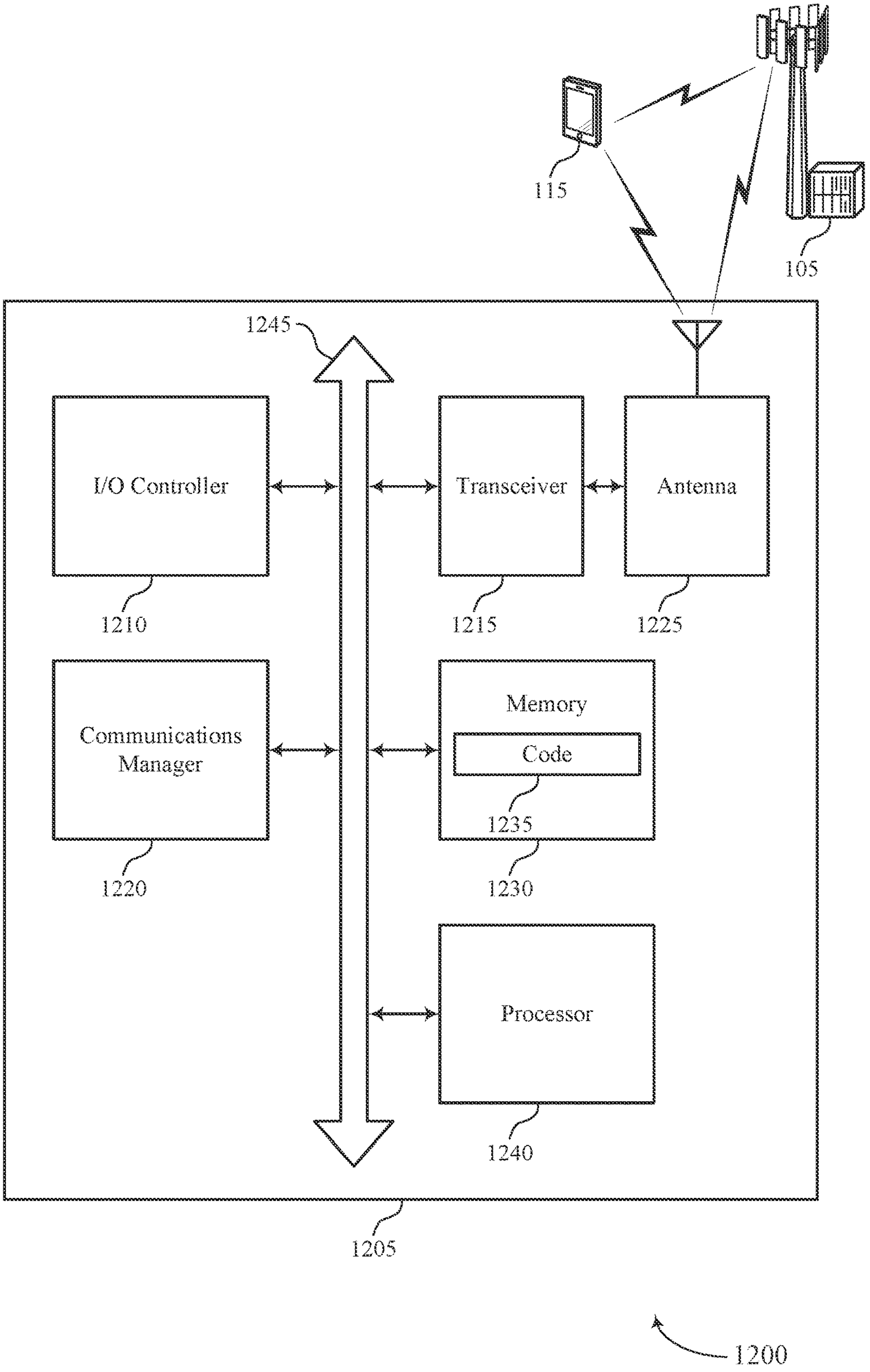
FIG. 12 shows a diagram of a system including a device that supports aspects for cross-link interference measurement in accordance with one or more aspects of the present disclosure.

FIG. 12 shows a diagram of a system 1200 including a device 1205 that supports aspects for cross-link interference measurement in accordance with one or more aspects of the present disclosure. The device 1205 may be an example of or include the components of a device 905, a device 1005, or a UE 115 as described herein. The device 1205 may communicate (e.g., wirelessly) with one or more network entities 105, one or more UEs 15, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The/O controller 1210 may also manage peripherals not integrated into the device 1205. In some cases, the I/O controller 1210 may represent a physical connection or port to an extremal peripheral. In some cases, the V/O controller 1210 may utilize an operating system such as iOS®, ANDROID®, MS-DOS®, MS-WINDOWS®, OS/2®, UNIX®, LINUX®, or another known operating system. Additionally, or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic 1/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting aspects for cross-link interference measurement). For example, the device 1205 or a component of the device 1205 may include a processor 1240 and memory 1230 coupled with or to the processor 1240, the processor 1240 and memory 1230 configured to perform various functions described herein.

The communications manager 1220 may support wireless communication at a UE (e.g., the device 1205) in accordance with examples as disclosed herein. For example, the communications manager 1220 may be configured as or otherwise support a means for receiving control signaling indicating a set of cross-link interference measurement occasions and a set of receive beams associated with the set of cross-link interference measurement occasions. The communications manager 1220 may be configured as or otherwise support a means for generating, based on the control signaling and a trigger of a cross-link interference measurement, a cross-link interference report indicating the cross-link interference measurement for at least one receive beam of the set of receive beams. The communications manager 1220 may be configured as or otherwise support a means for transmitting, to a network entity, the cross-link interference report.

By including or configuring the communications manager 1220 in accordance with examples as described herein, the device 1205 may support techniques for improved communication reliability, reduced latency, improved user experience related to reduced processing, more efficient utilization of communication resources, improved coordination between devices, and improved utilization of processing capability.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of aspects for cross-link interference measurement as described herein, or the processor 1240 and the memory 1230 may be otherwise configured to perform or support such operations.

Figure 13:
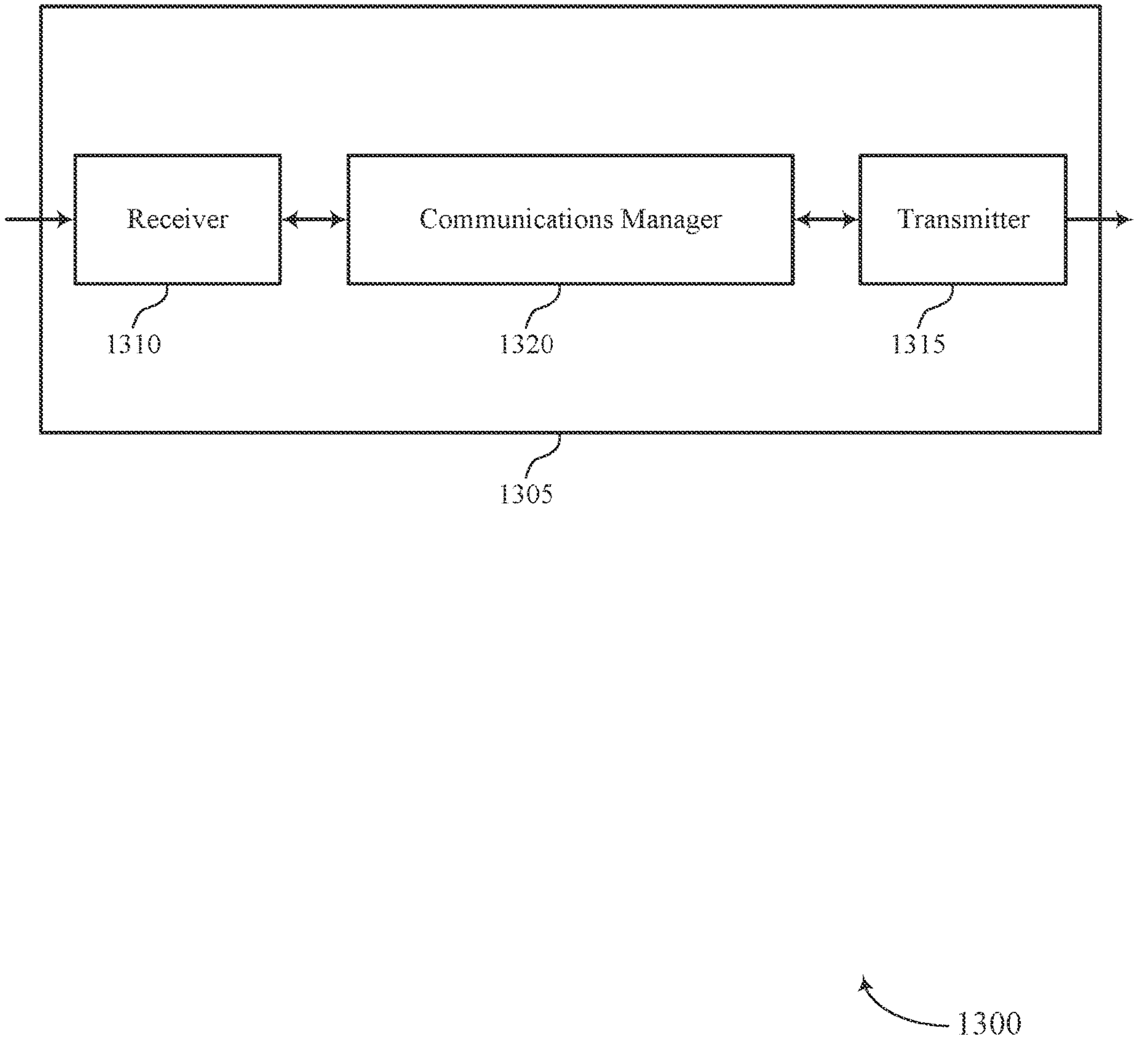
FIGS. 13 and 14 show block diagrams of devices that support aspects for cross-link interference measurement in accordance with one or more aspects of the present disclosure.

FIG. 13 shows a block diagram 1300 of a device 1305 that supports aspects for cross-link interference measurement in accordance with one or more aspects of the present disclosure. The device 1305 may be an example of aspects of a network entity 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1305. In some examples, the receiver 1310 may support obtaining information by receiving signals via one or more antennas. Additionally, or alternatively, the receiver 1310 may support obtaining information by receiving signals via one or more wired (e.g., electrical, fiber optic) interfaces, wireless interfaces, or any combination thereof.

The transmitter 1315 may provide a means for outputting (e.g., transmitting, providing, conveying, sending) information generated by other components of the device 1305. For example, the transmitter 1315 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1315 may support outputting information by transmitting signals via one or more antennas. Additionally, or alternatively, the transmitter 1315 may support outputting information by transmitting signals via one or more wired (e.g., electrical, fiber optic) interfaces, wireless interfaces, or any combination thereof. In some examples, the transmitter 1315 and the receiver 1310 may be co-located in a transceiver, which may include or be coupled with a modem.

The communications manager 1320, the receiver 1310, the transmitter 1315, or various combinations thereof or various components thereof may be examples of means for performing various aspects of aspects for cross-link interference measurement as described herein. For example, the communications manager 1320, the receiver 1310, the transmitter 1315, or various combinations or components thereof may support a method for performing one or more of the functions described herein.

In some examples, the communications manager 1320, the receiver 1310, the transmitter 1315, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1320, the receiver 1310, the transmitter 1315, or various combinations or components thereof may be implemented in code (e.g., as communications management software or firmware) executed by a processor. If implemented in code executed by a processor, the functions of the communications manager 1320, the receiver 1310, the transmitter 1315, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1320 may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communication at a network entity (e.g., the device 1305) in accordance with examples as disclosed herein. For example, the communications manager 1320 may be configured as or otherwise support a means for outputting control signaling indicating a set of cross-link interference measurement occasions and a set of receive beams associated with the set of cross-link interference measurement occasions for a UE to use to generate a cross-link interference report. The communications manager 1320 may be configured as or otherwise support a means for obtaining, from the UE, the cross-link interference report indicating a cross-link interference measurement for at least one receive beam of the set of receive beams.

By including or configuring the communications manager 1320 in accordance with examples as described herein, the device 1305 (e.g., a processor controlling or otherwise coupled with the receiver 1310, the transmitter 1315, the communications manager 1320, or a combination thereof) may support techniques for reduced processing and more efficient utilization of communication resources.

Figure 14:
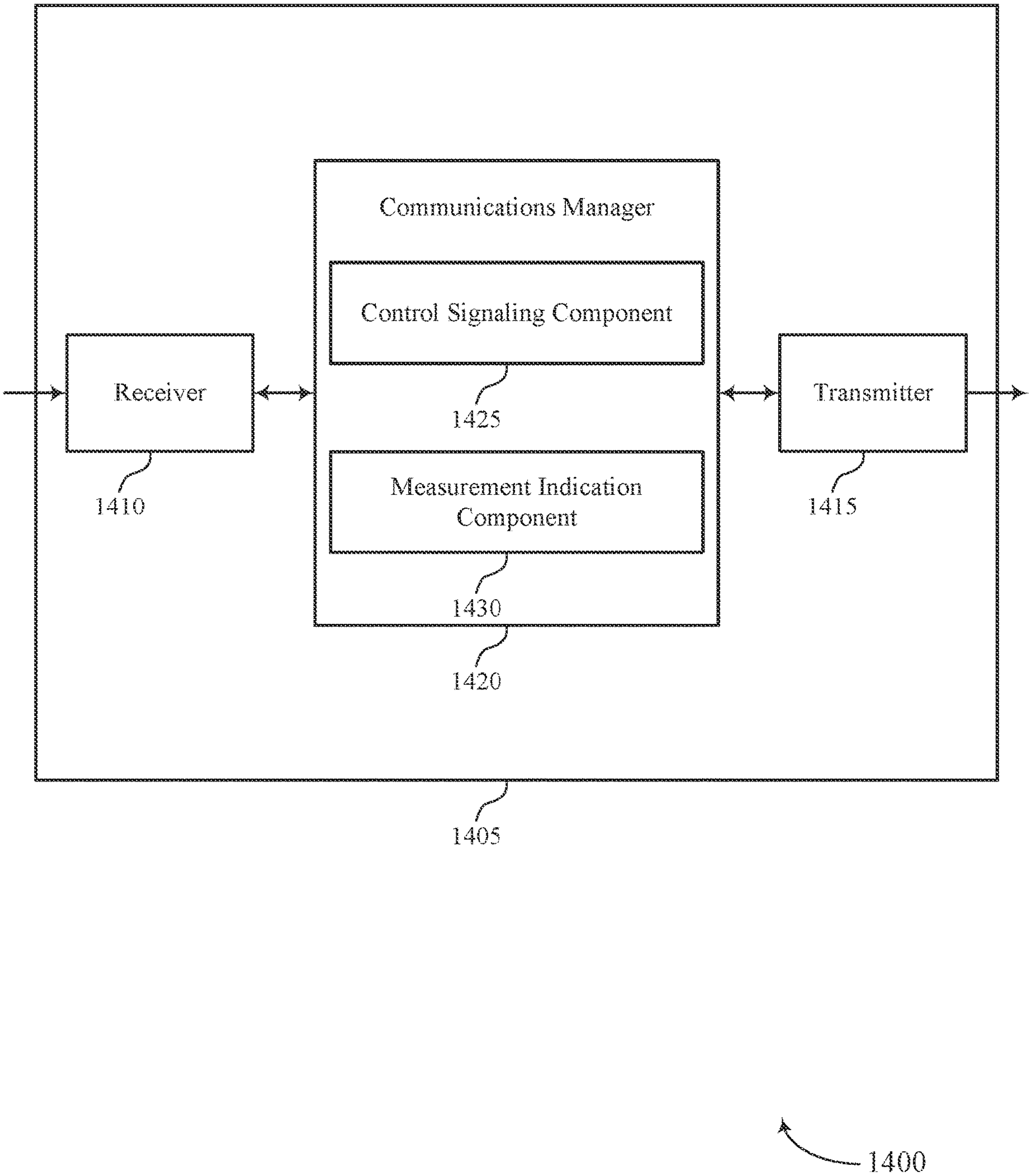

FIG. 14 shows a block diagram 1400 of a device 1405 that supports aspects for cross-link interference measurement in accordance with one or more aspects of the present disclosure. The device 1405 may be an example of aspects of a device 1305 or a network entity 105 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1405. In some examples, the receiver 1410 may support obtaining information by receiving signals via one or more antennas. Additionally, or alternatively, the receiver 1410 may support obtaining information by receiving signals via one or more wired (e.g., electrical, fiber optic) interfaces, wireless interfaces, or any combination thereof.

The transmitter 1415 may provide a means for outputting (e.g., transmitting, providing, conveying, sending) information generated by other components of the device 1405. For example, the transmitter 1415 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1415 may support outputting information by transmitting signals via one or more antennas. Additionally, or alternatively, the transmitter 1415 may support outputting information by transmitting signals via one or more wired (e.g., electrical, fiber optic) interfaces, wireless interfaces, or any combination thereof. In some examples, the transmitter 1415 and the receiver 1410 may be co-located in a transceiver, which may include or be coupled with a modem.

The device 1405, or various components thereof, may be an example of means for performing various aspects of aspects for cross-link interference measurement as described herein. For example, the communications manager 1420 may include a control signaling component 1425 a measurement indication component 1430, or any combination thereof. The communications manager 1420 may be an example of aspects of a communications manager 1320 as described herein. In some examples, the communications manager 1420, or various components thereof, may be configured to perform various operations (e.g., receiving, obtaining, monitoring, outputting, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to obtain information, output information, or perform various other operations as described herein.

The communications manager 1420 may support wireless communication at a network entity (e.g., the device 1405) in accordance with examples as disclosed herein. The control signaling component 1425 may be configured as or otherwise support a means for outputting control signaling indicating a set of cross-link interference measurement occasions and a set of receive beams associated with the set of cross-link interference measurement occasions for a UE to use to generate a cross-link interference report. The measurement indication component 1430 may be configured as or otherwise support a means for obtaining, from the UE, the cross-link interference report indicating a cross-link interference measurement for at least one receive beam of the set of receive beams.

Figure 15:
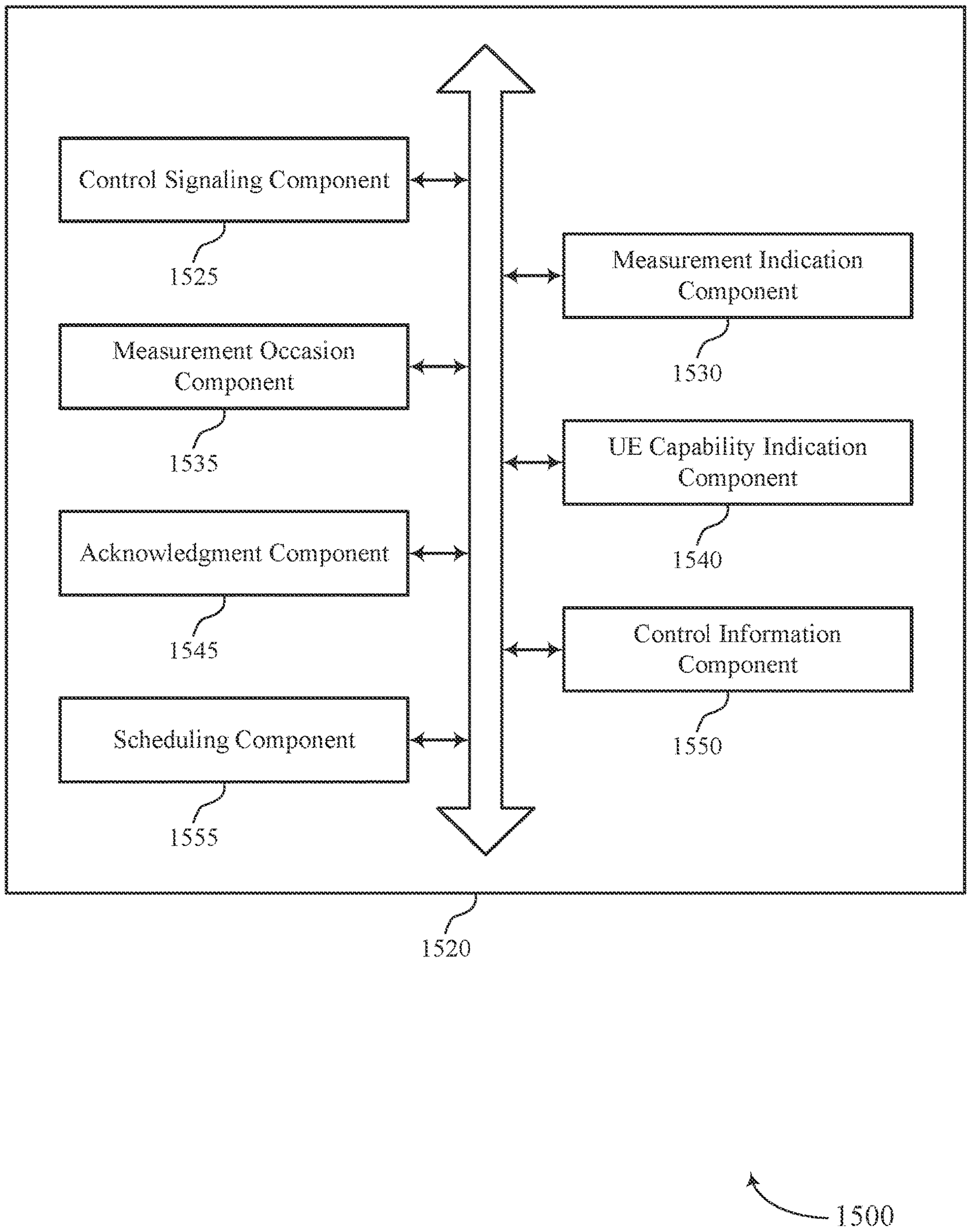
FIG. 15 shows a block diagram of a communications manager that supports aspects for cross-link interference measurement in accordance with one or more aspects of the present disclosure.

FIG. 15 shows a block diagram 1500 of a communications manager 1520 that supports aspects for cross-link interference measurement in accordance with one or more aspects of the present disclosure. The communications manager 1520 may be an example of aspects of a communications manager 1320, a communications manager 1420, or both, as described herein. The communications manager 1520, or various components thereof, may be an example of means for performing various aspects of aspects for cross-link interference measurement as described herein. For example, the communications manager 1520 may include a control signaling component 1525, a measurement indication component 1530, a measurement occasion component 1535, a UE capability indication component 1540, an acknowledgment component 1545, a control information component 1550, a scheduling component 1555, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1520 may support wireless communication at a network entity in accordance with examples as disclosed herein. The control signaling component 1525 may be configured as or otherwise support a means for outputting control signaling indicating a set of cross-link interference measurement occasions and a set of receive beams associated with the set of cross-link interference measurement occasions for a UE to use to generate a cross-link interference report. The measurement indication component 1530 may be configured as or otherwise support a means for obtaining, from the UE, the cross-link interference report indicating a cross-link interference measurement for at least one receive beam of the set of receive beams.

In some examples, the measurement occasion component 1535 may be configured as or otherwise support a means for outputting a DCI message indicating an occasion of the set of cross-link interference measurement occasions and a receive beam corresponding to the occasion, where the cross-link interference measurement is generated using the receive beam at least in part in response to a trigger that includes the occasion indicated by the DCI message. In some examples, the DCI message is scrambled with an RNTI that indicates the UE to generate the cross-link interference measurement, the cross-link interference report obtained on an uplink shared channel.

In some examples, to support outputting the control signaling indicating the set of cross-link interference measurement occasions and the set of receive beams associated with the set of cross-link interference measurement occasions, the measurement occasion component 1535 may be configured as or otherwise support a means for outputting a MAC-CE indicating the set of cross-link interference measurement occasions and the set of receive beams, where the cross-link interference measurement is generated using the at least one receive beam at least in part in response to a trigger that includes and occasion of the set of cross-link interference measurement occasions indicated by the MAC-CE.

In some examples, the acknowledgment component 1545 may be configured as or otherwise support a means for obtaining an acknowledgment message responsive to the MAC-CE, where the cross-link interference report is transmitted on an uplink control channel according to at least an offset from transmitting the acknowledgment message.

In some examples, the cross-link interference measurement of the cross-link interference report is generated based on an event detect at the UE. In some examples, to support obtaining the cross-link interference report, the control information component 1550 may be configured as or otherwise support a means for obtaining, on an uplink control channel, uplink control information including the cross-link interference report.

In some examples, the scheduling component 1555 may be configured as or otherwise support a means for obtaining a scheduling request from the UE. In some examples, the scheduling component 1555 may be configured as or otherwise support a means for outputting control signaling indicating uplink resources of a shared channel in response to the scheduling request, where obtaining the cross-link interference report includes obtaining, on the uplink resources of the shared channel, a MAC-CE including the cross-link interference report.

In some examples, the UE capability indication component 1540 may be configured as or otherwise support a means for obtaining UE capability signaling indicating a threshold offset for an offset between a DCI message and an occasion indicated by the DCI message for the cross-link interference measurement.

Figure 16:
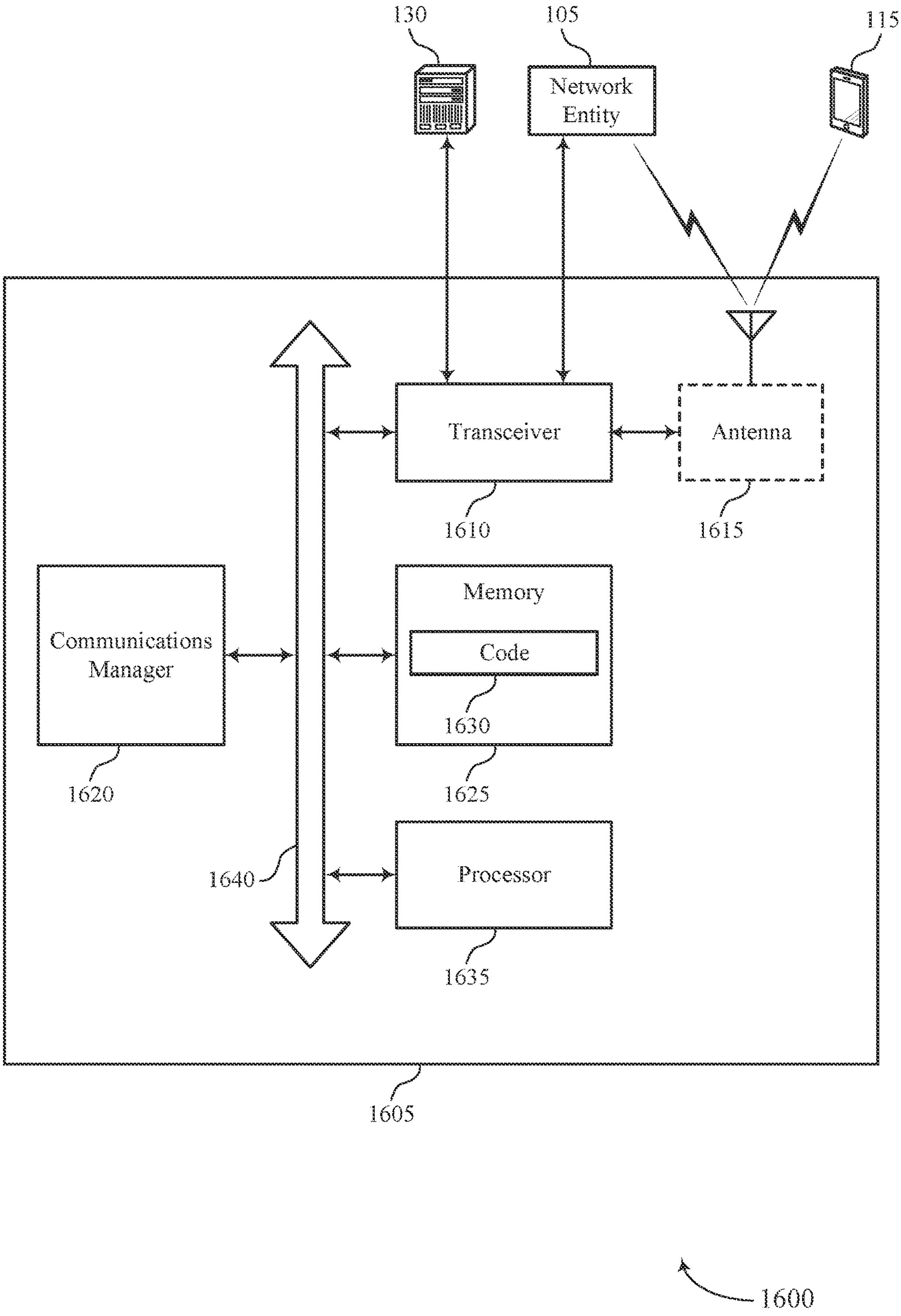
FIG. 16 shows a diagram of a system including a device that supports aspects for cross-link interference measurement in accordance with one or more aspects of the present disclosure.

FIG. 16 shows a diagram of a system 1600 including a device 1605 that supports aspects for cross-link interference measurement in accordance with one or more aspects of the present disclosure. The device 1605 may be an example of or include the components of a device 1305, a device 1405, or a network entity 105 as described herein. The device 1605 may communicate with one or more network entities 105, one or more UEs 115, or any combination thereof, which may include communications over one or more wired interfaces, over one or more wireless interfaces, or any combination thereof. The device 1605 may include components that support outputting and obtaining communications, such as a communications manager 1620, a transceiver 1610, an antenna 1615, a memory 1625, code 1630, and a processor 1635. These components may be in electronic communication or otherwise coupled (e.g., operatively, communicatively, functionally, electronically, electrically) via one or more buses (e.g., a bus 1640).

The transceiver 1610 may support bi-directional communications via wired links, wireless links, or both as described herein. In some examples, the transceiver 1610 may include a wired transceiver and may communicate bi-directionally with another wired transceiver. Additionally, or alternatively, in some examples, the transceiver 1610 may include a wireless transceiver and may communicate bi-directionally with another wireless transceiver. In some examples, the device 1605 may include one or more antennas 1615, which may be capable of transmitting or receiving wireless transmissions (e.g., concurrently). The transceiver 1610 may also include a modem to modulate signals, to provide the modulated signals for transmission (e.g., by one or more antennas 1615, by a wired transmitter), to receive modulated signals (e.g., from one or more antennas 1615, from a wired receiver), and to demodulate signals. The transceiver 1610, or the transceiver 1610 and one or more antennas 1615 or wired interfaces, where applicable, may be an example of a transmitter 1315, a transmitter 1415, a receiver 1310, a receiver 1410, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1625 may include RAM and ROM. The memory 1625 may store computer-readable, computer-executable code 1630 including instructions that, when executed by the processor 1635, cause the device 1605 to perform various functions described herein. The code 1630 may be stored in a non-transitory computer-readable medium such as system memory or another type of memory. In some cases, the code 1630 may not be directly executable by the processor 1635 but may cause a computer (e.g., when compiled and executed) to perform functions described herein. In some cases, the memory 1625 may contain, among other things, a BIOS which may control basic hardware or software operation such as the interaction with peripheral components or devices.

The processor 1635 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1635 may be configured to operate a memory array using a memory controller. In some other cases, a memory controller may be integrated into the processor 1635. The processor 1635 may be configured to execute computer-readable instructions stored in a memory (e.g., the memory 1625) to cause the device 1605 to perform various functions (e.g., functions or tasks supporting aspects for cross-link interference measurement). For example, the device 1605 or a component of the device 1605 may include a processor 1635 and memory 1625 coupled with the processor 1635, the processor 1635 and memory 1625 configured to perform various functions described herein. The processor 1635 may be an example of a cloud-computing platform (e.g., one or more physical nodes and supporting software such as operating systems, virtual machines, or container instances) that may host the functions (e.g., by executing code 1630) to perform the functions of the device 1605.

In some examples, a bus 1640 may support communications of (e.g., within) a protocol layer of a protocol stack. In some examples, a bus 1640 may support communications associated with a logical channel of a protocol stack (e.g., between protocol layers of a protocol stack), which may include communications performed within a component of the device 1605, or between different components of the device 1605 that may be co-located or located in different locations (e.g., where the device 1605 may refer to a system in which one or more of the communications manager 1620, the transceiver 1610, the memory 1625, the code 1630, and the processor 1635 may be located in one of the different components or divided between different components).

In some examples, the communications manager 1620 may manage aspects of communications with a core network 130 (e.g., via one or more wired or wireless backhaul links). For example, the communications manager 1620 may manage the transfer of data communications for client devices, such as one or more UEs 115. In some examples, the communications manager 1620 may manage communications with other network entities 105, and may include a controller or scheduler for controlling communications with UEs 115 in cooperation with other network entities 105. In some examples, the communications manager 1620 may support an X2 interface within an LTE/LTE-A wireless communications network technology to provide communication between network entities 105.

The communications manager 1620 may support wireless communication at a network entity (e.g., the device 1605) in accordance with examples as disclosed herein. For example, the communications manager 1620 may be configured as or otherwise support a means for outputting control signaling indicating a set of cross-link interference measurement occasions and a set of receive beams associated with the set of cross-link interference measurement occasions for a UE to use to generate a cross-link interference report. The communications manager 1620 may be configured as or otherwise support a means for obtaining, from the UE, the cross-link interference report indicating a cross-link interference measurement for at least one receive beam of the set of receive beams.

By including or configuring the communications manager 1620 in accordance with examples as described herein, the device 1605 may support techniques for improved communication reliability, reduced latency, improved user experience related to reduced processing, more efficient utilization of communication resources, improved coordination between devices, and improved utilization of processing.

In some examples, the communications manager 1620 may be configured to perform various operations (e.g., receiving, obtaining, monitoring, outputting, transmitting) using or otherwise in cooperation with the transceiver 1610, the one or more antennas 1615 (e.g., where applicable), or any combination thereof. Although the communications manager 1620 is illustrated as a separate component, in some examples, one or more functions described with reference to the communications manager 1620 may be supported by or performed by the processor 1635, the memory 1625, the code 1630, the transceiver 1610, or any combination thereof. For example, the code 1630 may include instructions executable by the processor 1635 to cause the device 1605 to perform various aspects of aspects for cross-link interference measurement as described herein, or the processor 1635 and the memory 1625 may be otherwise configured to perform or support such operations.

Figure 17:
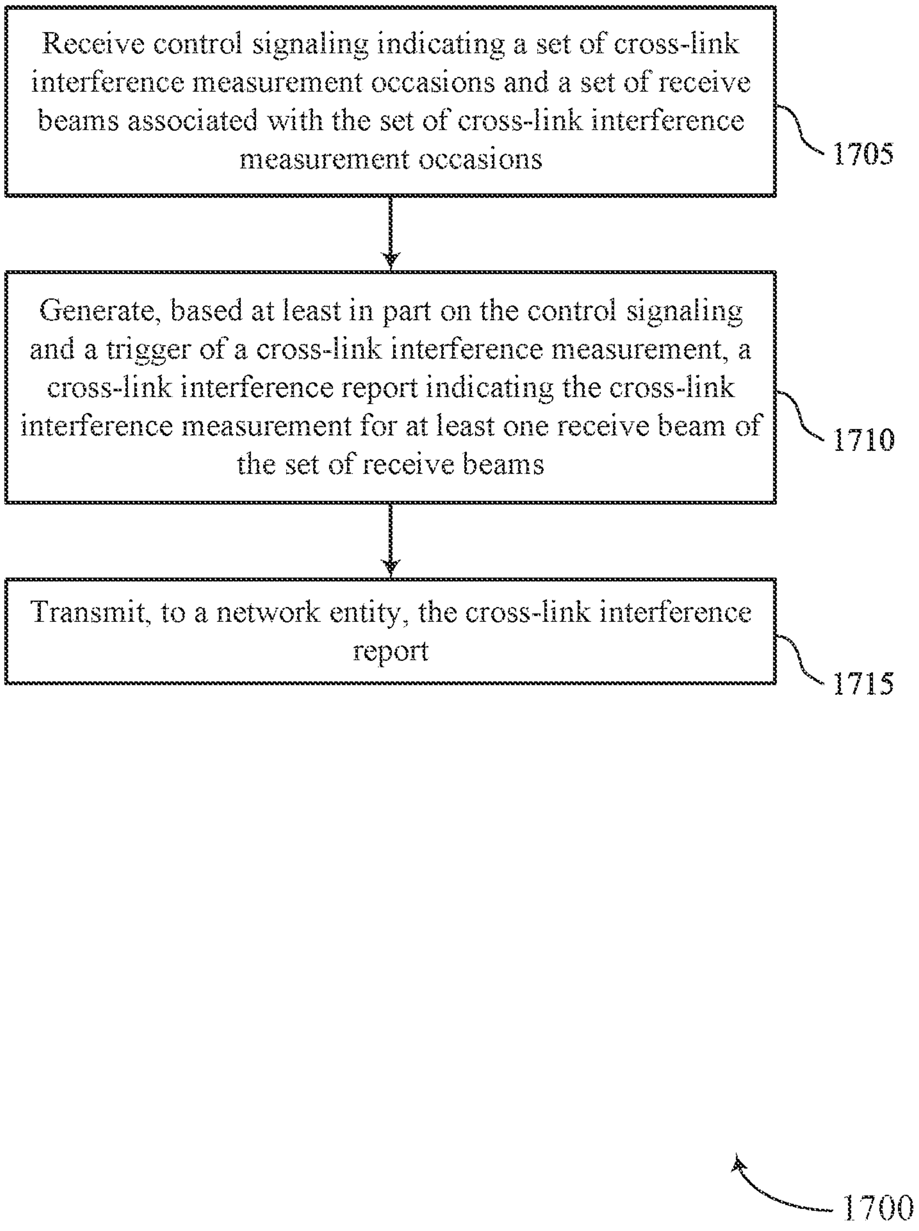
FIGS. 17 through 21 show flowcharts illustrating methods that support aspects for cross-link interference measurement in accordance with one or more aspects of the present disclosure.

FIG. 17 shows a flowchart illustrating a method 1700 that supports aspects for cross-link interference measurement in accordance with one or more aspects of the present disclosure. The operations of the method 1700 may be implemented by a UE or its components as described herein. For example, the operations of the method 1700 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1705, the method may include receiving control signaling indicating a set of cross-link interference measurement occasions and a set of receive beams associated with the set of cross-link interference measurement occasions. The operations of 1705 may be performed in accordance with examples as disclosed herein. In some examples, aspects of the operations of 1705 may be performed by a measurement occasion indication component 1125 as described with reference to FIG. 11.

At 1710, the method may include generating, based on the control signaling and a trigger of a cross-link interference measurement, a cross-link interference report indicating the cross-link interference measurement for at least one receive beam of the set of receive beams. The operations of 1710 may be performed in accordance with examples as disclosed herein. In some examples, aspects of the operations of 1710 may be performed by a measurement component 1130 as described with reference to FIG. 11.

At 1715, the method may include transmitting, to a network entity, the cross-link interference report. The operations of 1715 may be performed in accordance with examples as disclosed herein. In some examples, aspects of the operations of 1715 may be performed by a report component 1135 as described with reference to FIG. 11.

Figure 18:
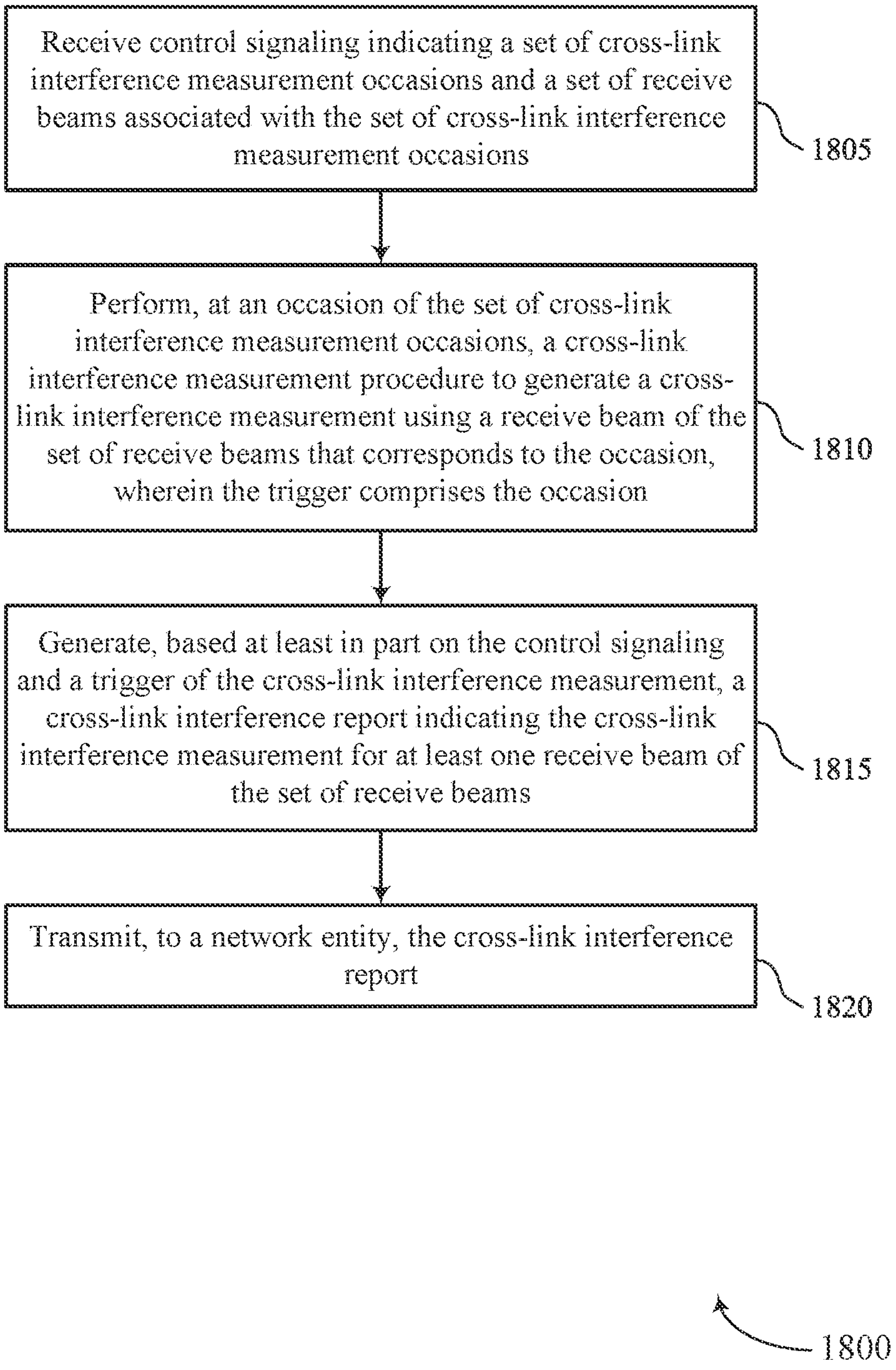

FIG. 18 shows a flowchart illustrating a method 1800 that supports aspects for cross-link interference measurement in accordance with one or more aspects of the present disclosure. The operations of the method 1800 may be implemented by a UE or its components as described herein. For example, the operations of the method 1800 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1805, the method may include receiving control signaling indicating a set of cross-link interference measurement occasions and a set of receive beams associated with the set of cross-link interference measurement occasions. The operations of 1805 may be performed in accordance with examples as disclosed herein. In some examples, aspects of the operations of 1805 may be performed by a measurement occasion indication component 1125 as described with reference to FIG. 11.

At 1810, the method may include performing, at an occasion of the set of cross-link interference measurement occasions, a cross-link interference measurement procedure to generate a cross-link interference measurement using a receive beam of the set of receive beams that corresponds to the occasion, where the trigger includes the occasion. The operations of 1810 may be performed in accordance with examples as disclosed herein. In some examples, aspects of the operations of 1810 may be performed by a measurement component 1130 as described with reference to FIG. 11.

At 1815, the method may include generating, based on the control signaling and a trigger of the cross-link interference measurement, a cross-link interference report indicating the cross-link interference measurement for at least one receive beam of the set of receive beams. The operations of 1815 may be performed in accordance with examples as disclosed herein. In some examples, aspects of the operations of 1815 may be performed by a measurement component 1130 as described with reference to FIG. 11.

At 1820, the method may include transmitting, to a network entity, the cross-link interference report. The operations of 1820 may be performed in accordance with examples as disclosed herein. In some examples, aspects of the operations of 1820 may be performed by a report component 1135 as described with reference to FIG. 11.

Figure 19:
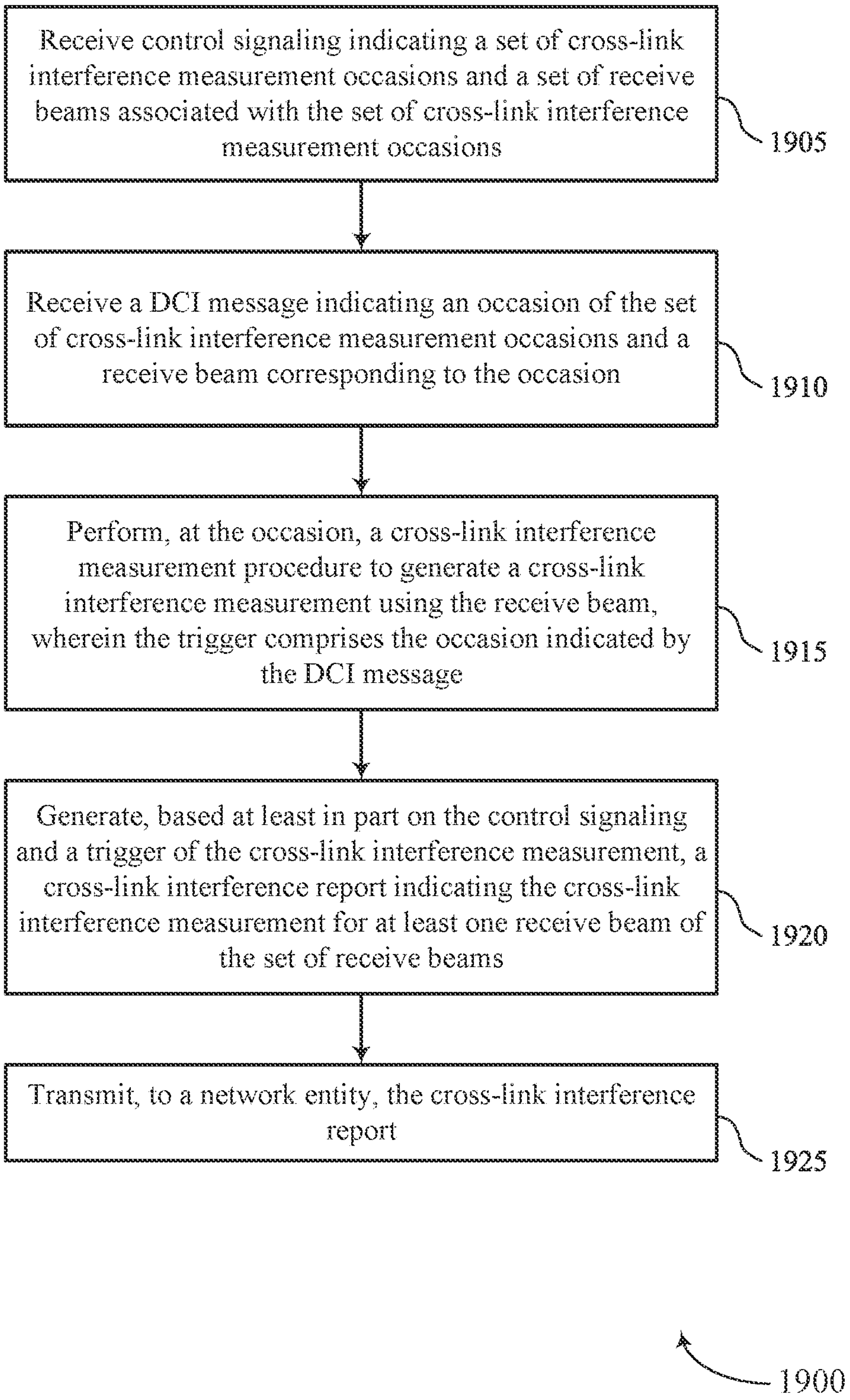

FIG. 19 shows a flowchart illustrating a method 1900 that supports aspects for cross-link interference measurement in accordance with one or more aspects of the present disclosure. The operations of the method 1900 may be implemented by a UE or its components as described herein. For example, the operations of the method 1900 may be performed by a UE 115 as described with reference to FIGS. 1 through 12. In some examples, a UE may execute a set of instructions to control the functional elements of the UE to perform the described functions. Additionally. or alternatively, the UE may perform aspects of the described functions using special-purpose hardware.

At 1905, the method may include receiving control signaling indicating a set of cross-link interference measurement occasions and a set of receive beams associated with the set of cross-link interference measurement occasions. The operations of 1905 may be performed in accordance with examples as disclosed herein. In some examples, aspects of the operations of 1905 may be performed by a measurement occasion indication component 1125 as described with reference to FIG. 11.

At 1910, the method may include receiving a DCI message indicating an occasion of the set of cross-link interference measurement occasions and a receive beam corresponding to the occasion. The operations of 1910 may be performed in accordance with examples as disclosed herein. In some examples, aspects of the operations of 1910 may be performed by a measurement occasion indication component 1125 as described with reference to FIG. 11.

At 1915, the method may include performing, at the occasion, a cross-link interference measurement procedure to generate a cross-link interference measurement using the receive beam, where the trigger includes the occasion indicated by the DCI message. The operations of 1915 may be performed in accordance with examples as disclosed herein. In some examples, aspects of the operations of 1915 may be performed by a measurement component 1130 as described with reference to FIG. 11.

At 1920, the method may include generating, based on the control signaling and a trigger of a cross-link interference measurement, a cross-link interference report indicating the cross-link interference measurement for at least one receive beam of the set of receive beams. The operations of 1920 may be performed in accordance with examples as disclosed herein. In some examples, aspects of the operations of 1920 may be performed by a measurement component 1130 as described with reference to FIG. 11.

At 1925, the method may include transmitting, to a network entity, the cross-link interference report. The operations of 1925 may be performed in accordance with examples as disclosed herein. In some examples, aspects of the operations of 1925 may be performed by a report component 1135 as described with reference to FIG. 11.

Figure 20:
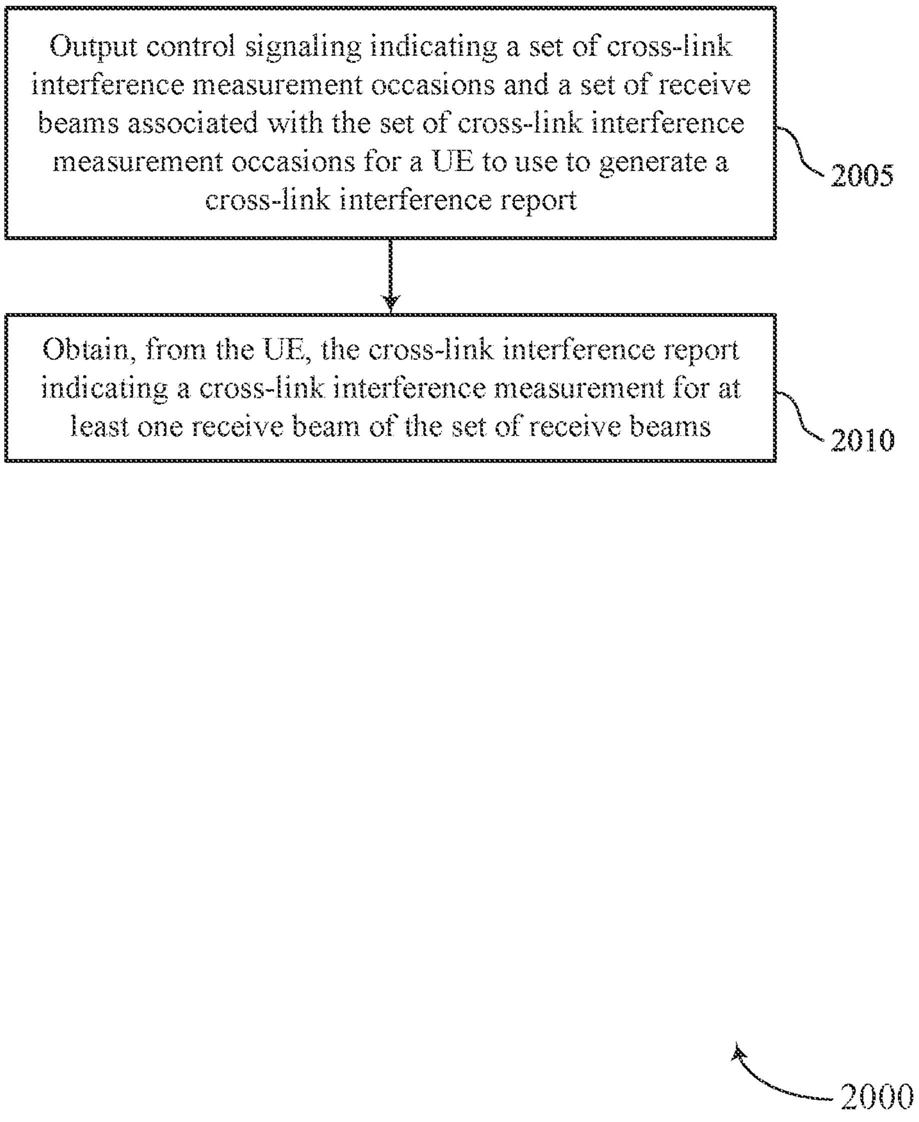

FIG. 20 shows a flowchart illustrating a method 2000 that supports aspects for cross-link interference measurement in accordance with one or more aspects of the present disclosure. The operations of the method 2000 may be implemented by a network entity or its components as described herein. For example, the operations of the method 2000 may be performed by a network entity as described with reference to FIGS. 1 through 8 and 13 through 16. In some examples, a network entity may execute a set of instructions to control the functional elements of the network entity to perform the described functions. Additionally, or alternatively, the network entity may perform aspects of the described functions using special-purpose hardware.

At 2005, the method may include outputting control signaling indicating a set of cross-link interference measurement occasions and a set of receive beams associated with the set of cross-link interference measurement occasions for a UE to use to generate a cross-link interference report. The operations of 2005 may be performed in accordance with examples as disclosed herein. In some examples, aspects of the operations of 2005 may be performed by a control signaling component 1525 as described with reference to FIG. 15.

At 2010, the method may include obtaining, from the UE, the cross-link interference report indicating a cross-link interference measurement for at least one receive beam of the set of receive beams. The operations of 2010 may be performed in accordance with examples as disclosed herein. In some examples, aspects of the operations of 2010 may be performed by a measurement indication component 1530 as described with reference to FIG. 15.

Figure 21:
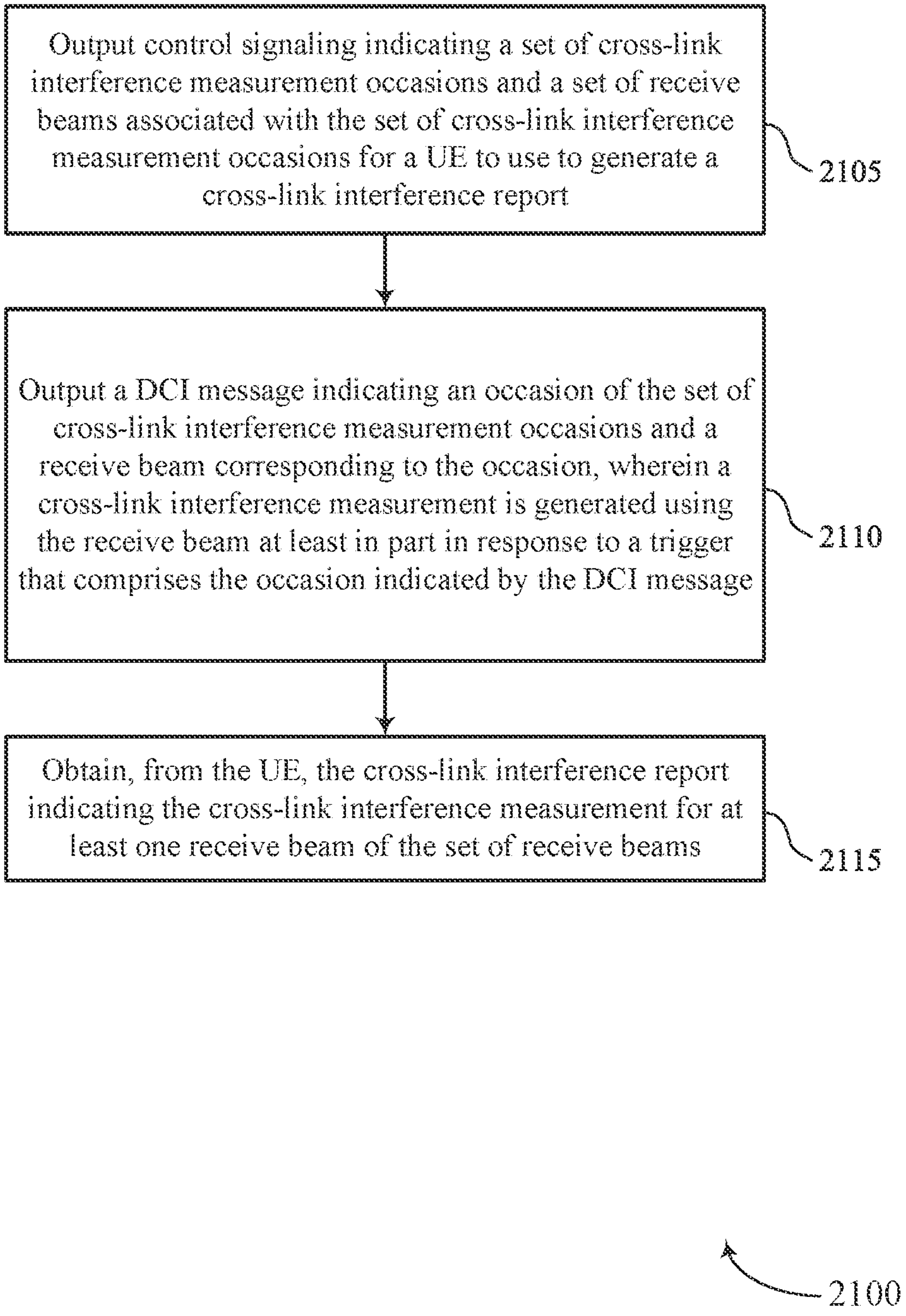

FIG. 21 shows a flowchart illustrating a method 2100 that supports aspects for cross-link interference measurement in accordance with one or more aspects of the present disclosure. The operations of the method 2100 may be implemented by a network entity or its components as described herein. For example, the operations of the method 2100 may be performed by a network entity as described with reference to FIGS. 1 through 8 and 13 through 16. In some examples, a network entity may execute a set of instructions to control the functional elements of the network entity to perform the described functions. Additionally. or alternatively, the network entity may perform aspects of the described functions using special-purpose hardware.

At 2105, the method may include outputting control signaling indicating a set of cross-link interference measurement occasions and a set of receive beams associated with the set of cross-link interference measurement occasions for a UE to use to generate a cross-link interference report. The operations of 2105 may be performed in accordance with examples as disclosed herein. In some examples, aspects of the operations of 2105 may be performed by a control signaling component 1525 as described with reference to FIG. 15.

At 2110, the method may include outputting a DCI message indicating an occasion of the set of cross-link interference measurement occasions and a receive beam corresponding to the occasion, where a cross-link interference measurement is generated using the receive beam at least in part in response to a trigger that includes the occasion indicated by the DCI message. The operations of 2110 may be performed in accordance with examples as disclosed herein. In some examples, aspects of the operations of 2110 may be performed by a measurement occasion component 1535 as described with reference to FIG. 15.

At 2115, the method may include obtaining, from the UE, the cross-link interference report indicating the cross-link interference measurement for at least one receive beam of the set of receive beams. The operations of 2115 may be performed in accordance with examples as disclosed herein. In some examples, aspects of the operations of 2115 may be performed by a measurement indication component 1530 as described with reference to FIG. 15.

The following provides an overview of aspects of the present disclosure:

Aspect 1: A method for wireless communication at a UE, comprising: receiving control signaling indicating a set of cross-link interference measurement occasions and a set of receive beams associated with the set of cross-link interference measurement occasions; generating, based at least in part on the control signaling and a trigger of a cross-link interference measurement, a cross-link interference report indicating the cross-link interference measurement for at least one receive beam of the set of receive beams; and transmitting, to a network entity, the cross-link interference report.

Aspect 2: The method of aspect 1, further comprising: performing, at an occasion of the set of cross-link interference measurement occasions, a cross-link interference measurement procedure to generate the cross-link interference measurement using a receive beam of the set of receive beams that corresponds to the occasion, wherein the trigger comprises the occasion.

Aspect 3: The method of aspect 1, further comprising: receiving a DCI message indicating an occasion of the set of cross-link interference measurement occasions and a receive beam corresponding to the occasion; and performing, at the occasion, a cross-link interference measurement procedure to generate the cross-link interference measurement using the receive beam, wherein the trigger comprises the occasion indicated by the DCI message.

Aspect 4: The method of aspect 3, wherein the DCI message is scrambled with an RNTI that indicates the UE to generate the cross-link interference measurement, the cross-link interference report transmitted on an uplink shared channel.

Aspect 5: The method of aspect 1, wherein receiving the control signaling indicating the set of cross-link interference measurement occasions and the set of receive beams associated with the set of cross-link interference measurement occasions comprises: receiving a MAC-CE indicating the set of cross-link interference measurement occasions and the set of receive beams; and the method further comprises: performing, at an occasion of the set of cross-link interference measurement occasions, a cross-link interference measurement procedure to generate the cross-link interference measurement using a receive beam of the set of receive beams that corresponds to the occasion, wherein the trigger comprises the occasion indicated by the MAC-CE.

Aspect 6: The method of aspect 5, further comprising: transmitting an acknowledgment message responsive to the MAC-CE, wherein the cross-link interference report is transmitted on an uplink control channel according to at least an offset from transmitting the acknowledgment message.

Aspect 7: The method of aspect 1, further comprising: performing a cross-link interference measurement procedure to generate the cross-link interference measurement based at least in part on the UE detecting an event, wherein the event comprises the trigger.

Aspect 8: The method of aspect 7, wherein transmitting the cross-link interference report comprises: transmitting, on an uplink control channel, an uplink control information message that comprises the cross-link interference report.

Aspect 9: The method of aspect 7, further comprising: transmitting a scheduling request to the network entity: and receiving control signaling indicating uplink resources of a shared channel in response to the scheduling request, wherein transmitting the cross-link interference report comprises transmitting, on the uplink resources of the shared channel, a MAC-CE comprising the cross-link interference report.

Aspect 10: The method of aspect 1, wherein the at least one receive beam comprises a default receive beam, the method further comprising: selecting the default receive beam for the cross-link interference measurement based at least in part on an offset between a DCI message and an occasion indicated by the DCI message for the cross-link interference measurement being less than a threshold offset, wherein the default receive beam is different than a second receive beam of the set of receive beams that is associated with the occasion.

Aspect 11: The method of aspect 10, further comprising: transmitting, to the network entity, UE capability signaling indicating the threshold offset.

Aspect 12: The method of any of aspects 10 through 11, wherein the threshold offset includes a first offset value and a second offset value, the second offset value is based at least in part on whether the DCI message and the occasion indicated by the DCI message are associated with a same subcarrier spacing.

Aspect 13: The method of any of aspects 1 through 12, further comprising: identifying a QCL relationship for a downlink signal received at the UE, wherein the network entity communicates with the UE via a single transmission-reception point: and performing, at an occasion of the set of cross-link interference measurement occasions, a measurement procedure to generate the cross-link interference measurement using the QCL relationship based at least in part on the downlink signal overlapping the occasion.

Aspect 14: The method of any of aspects 1 through 12, further comprising: identifying a first QCL relationship for a downlink signal received at the UE, wherein the network entity communicates with the UE via a single transmission-reception point; and performing, at an occasion of the set of cross-link interference measurement occasions, a measurement procedure to generate the cross-link interference measurement using a second QCL relationship associated with a lowest CORESET identifier based at least in part on the downlink signal not overlapping the occasion.

Aspect 15: The method of any of aspects 1 through 12, further comprising: selecting the at least one receive beam of the set of receive beams for the cross-link interference measurement based at least in part on: for single DCI message operation with a plurality of transmission-reception points, a TCI codepoint having a lowest identifier value and that identifies a plurality of TCI states corresponding to the plurality of transmission-reception points: for multiple DCI message operation for a plurality of transmission-reception points, a TCI state associated with a most recently monitored CORESET for each CORESET pool; for SFN operation, a TCI codepoint having a lowest identifier value; and for cross-carrier scheduling operation, a TCI codepoint having a lowest identifier value.

Aspect 16: A method for wireless communication at a network entity, comprising: outputting control signaling indicating a set of cross-link interference measurement occasions and a set of receive beams associated with the set of cross-link interference measurement occasions for a UE to use to generate a cross-link interference report; and obtaining, from the UE, the cross-link interference report indicating a cross-link interference measurement for at least one receive beam of the set of receive beams.

Aspect 17: The method of aspect 16, further comprising: outputting a DCI message indicating an occasion of the set of cross-link interference measurement occasions and a receive beam corresponding to the occasion, wherein the cross-link interference measurement is generated using the receive beam at least in part in response to a trigger that comprises the occasion indicated by the DCI message.

Aspect 18: The method of aspect 17, wherein the DCI message is scrambled with an RNTI that indicates the UE to generate the cross-link interference measurement, the cross-link interference report obtained on an uplink shared channel.

Aspect 19: The method of aspect 16, wherein outputting the control signaling indicating the set of cross-link interference measurement occasions and the set of receive beams associated with the set of cross-link interference measurement occasions comprises: outputting a MAC-CE indicating the set of cross-link interference measurement occasions and the set of receive beams, wherein the cross-link interference measurement is generated using the at least one receive beam at least in part in response to a trigger that comprises and occasion of the set of cross-link interference measurement occasions indicated by the MAC-CE.

Aspect 20: The method of aspect 19, further comprising: obtaining an acknowledgment message responsive to the MAC-CE, wherein the cross-link interference report is transmitted on an uplink control channel according to at least an offset from transmitting the acknowledgment message.

Aspect 21: The method of aspect 16, wherein the cross-link interference measurement of the cross-link interference report is generated based at least in part on an event detect at the UE.

Aspect 22: The method of aspect 21, wherein obtaining the cross-link interference report comprises: obtaining, on an uplink control channel, uplink control information comprising the cross-link interference report.

Aspect 23: The method of aspect 21, further comprising: obtaining a scheduling request from the UE: and outputting control signaling indicating uplink resources of a shared channel in response to the scheduling request, wherein obtaining the cross-link interference report comprises obtaining, on the uplink resources of the shared channel, a MAC-CE comprising the cross-link interference report.

Aspect 24: The method of aspect 16, further comprising: obtaining UE capability signaling indicating a threshold offset for an offset between a DCI message and an occasion indicated by the DCI message for the cross-link interference measurement.

Aspect 25: An apparatus for wireless communication at a UE, comprising a processor; memory coupled with the processor; and instructions stored in the memory and executable by the processor to cause the apparatus to perform a method of any of aspects 1 through 15.

Aspect 26: An apparatus for wireless communication at a UE, comprising at least one means for performing a method of any of aspects 1 through 15.

Aspect 27: A non-transitory computer-readable medium storing code for wireless communication at a UE, the code comprising instructions executable by a processor to perform a method of any of aspects 1 through 15.

Aspect 28: An apparatus for wireless communication at a network entity, comprising a processor; memory coupled with the processor; and instructions stored in the memory and executable by the processor to cause the apparatus to perform a method of any of aspects 16 through 24.

Aspect 29: An apparatus for wireless communication at a network entity, comprising at least one means for performing a method of any of aspects 16 through 24.

Aspect 30: A non-transitory computer-readable medium storing code for wireless communication at a network entity, the code comprising instructions executable by a processor to perform a method of any of aspects 16 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A. B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
- one or more processors;
- one or more memories coupled with the one or more processors; and
- instructions stored in the one or more memories and executable by the one or more processors to cause the apparatus to:
  - receive control signaling indicating a set of cross-link interference measurement occasions and a set of receive beams associated with the set of cross-link interference measurement occasions;
  - generate, based at least in part on the control signaling and a trigger of a cross-link interference measurement, a cross-link interference report indicating the cross-link interference measurement for at least one receive beam of the set of receive beams; and
  - transmit, to a network entity, the cross-link interference report.

2. The apparatus of claim 1, wherein the instructions are further executable by the one or more processors to cause the apparatus to:
- perform, at an occasion of the set of cross-link interference measurement occasions, a cross-link interference measurement procedure to generate the cross-link interference measurement using a receive beam of the set of receive beams that corresponds to the occasion, wherein the trigger comprises the occasion.

3. The apparatus of claim 1, wherein the instructions are further executable by the one or more processors to cause the apparatus to:

receive a downlink control information message indicating an occasion of the set of cross-link interference measurement occasions and a receive beam corresponding to the occasion; and perform, at the occasion, a cross-link interference measurement procedure to generate the cross-link interference measurement using the receive beam, wherein the trigger comprises the occasion indicated by the downlink control information message.

4. The apparatus of claim 3, wherein the downlink control information message is scrambled with a radio network temporary identifier that indicates the UE to generate the cross-link interference measurement, the cross-link interference report transmitted on an uplink shared channel.

5. The apparatus of claim 1, wherein the instructions to receive the control signaling indicating the set of cross-link interference measurement occasions and the set of receive beams associated with the set of cross-link interference measurement occasions are executable by the one or more processors to cause the apparatus to:

receive a media access control control element indicating the set of cross-link interference measurement occasions and the set of receive beams; and the apparatus further comprises instructions further executable by the one or more processors to cause the apparatus to:

perform, at an occasion of the set of cross-link interference measurement occasions, a cross-link interference measurement procedure to generate the cross-link interference measurement using a receive beam of the set of receive beams that corresponds to the occasion, wherein the trigger comprises the occasion indicated by the media access control control element.

6. The apparatus of claim 5, wherein the instructions are further executable by the one or more processors to cause the apparatus to:

transmit an acknowledgment message responsive to the media access control control element, wherein the cross-link interference report is transmitted on an uplink control channel according to at least an offset from transmitting the acknowledgment message.

7. The apparatus of claim 1, wherein the instructions are further executable by the one or more processors to cause the apparatus to:

perform a cross-link interference measurement procedure to generate the cross-link interference measurement based at least in part on the UE detecting an event, wherein the event comprises the trigger.

8. The apparatus of claim 7, wherein the instructions to transmit the cross-link interference report are executable by the one or more processors to cause the apparatus to:

transmit, on an uplink control channel, an uplink control information message that comprises the cross-link interference report.

9. The apparatus of claim 7, wherein the instructions are further executable by the one or more processors to cause the apparatus to:

transmit a scheduling request to the network entity; and receive control signaling indicating uplink resources of a shared channel in response to the scheduling request, wherein transmitting the cross-link interference report comprises transmitting, on the uplink resources of the shared channel, a media access control control element comprising the cross-link interference report.

10. The apparatus of claim 1, wherein the at least one receive beam comprises a default receive beam, and the instructions are further executable by the one or more processors to cause the apparatus to:

select the default receive beam for the cross-link interference measurement based at least in part on an offset between a downlink control information message and an occasion indicated by the downlink control information message for the cross-link interference measurement being less than a threshold offset, wherein the default receive beam is different than a second receive beam of the set of receive beams that is associated with the occasion.

11. The apparatus of claim 10, wherein the instructions are further executable by the one or more processors to cause the apparatus to:

transmit, to the network entity, UE capability signaling indicating the threshold offset.

12. The apparatus of claim 10, wherein:

the threshold offset includes a first offset value and a second offset value, and the second offset value is based at least in part on whether the downlink control information message and the occasion indicated by the downlink control information message are associated with a same subcarrier spacing.

13. The apparatus of claim 1, wherein the instructions are further executable by the one or more processors to cause the apparatus to:

identify a quasi co-location relationship for a downlink signal received at the UE, wherein the network entity communicates with the UE via a single transmission-reception point; and perform, at an occasion of the set of cross-link interference measurement occasions, a measurement procedure to generate the cross-link interference measurement using the quasi co-location relationship based at least in part on the downlink signal overlapping the occasion.

14. The apparatus of claim 1, wherein the instructions are further executable by the one or more processors to cause the apparatus to:

identify a first quasi co-location relationship for a downlink signal received at the UE, wherein the network entity communicates with the UE via a single transmission-reception point; and perform, at an occasion of the set of cross-link interference measurement occasions, a measurement procedure to generate the cross-link interference measurement using a second quasi co-location relationship associated with a lowest control resource set identifier based at least in part on the downlink signal not overlapping the occasion.

15. The apparatus of claim 1, wherein the instructions are further executable by the one or more processors to cause the apparatus to:

select the at least one receive beam of the set of receive beams for the cross-link interference measurement based at least in part on:

for single downlink control information message operation with a plurality of transmission-reception points, a transmission configuration indicator codepoint having a lowest identifier value and that identifies a plurality of transmission configuration indicator states corresponding to the plurality of transmission-reception points;

for multiple downlink control information message operation for a plurality of transmission-reception points, a transmission configuration indicator state associated with a most recently monitored control resource set for each control resource set pool;

for single frequency network operation, a transmission configuration indicator codepoint having a lowest identifier value; and for cross-carrier scheduling operation, a transmission configuration indicator codepoint having a lowest identifier value.

16. An apparatus for wireless communication at a network entity, comprising:

one or more processors;

one or more memories coupled with the one or more processors; and instructions stored in the one or more memories and executable by the one or more processors to cause the apparatus to:

output control signaling indicating a set of cross-link interference measurement occasions and a set of receive beams associated with the set of cross-link interference measurement occasions for a user equipment (UE) to use to generate a cross-link interference report; and obtain, from the UE, the cross-link interference report indicating a cross-link interference measurement for at least one receive beam of the set of receive beams.

17. The apparatus of claim 16, wherein the instructions are further executable by the one or more processors to cause the apparatus to:

output a downlink control information message indicating an occasion of the set of cross-link interference measurement occasions and a receive beam corresponding to the occasion, wherein the cross-link interference measurement is generated using the receive beam at least in part in response to a trigger that comprises the occasion indicated by the downlink control information message.

18. The apparatus of claim 17, wherein the downlink control information message is scrambled with a radio network temporary identifier that indicates the UE to generate the cross-link interference measurement, the cross-link interference report obtained on an uplink shared channel.

19. The apparatus of claim 16, wherein the instructions to output the control signaling indicating the set of cross-link interference measurement occasions and the set of receive beams associated with the set of cross-link interference measurement occasions are executable by the one or more processors to cause the apparatus to:

output a media access control control element indicating the set of cross-link interference measurement occasions and the set of receive beams, wherein the cross-link interference measurement is generated using the at least one receive beam at least in part in response to a trigger that comprises and occasion of the set of cross-link interference measurement occasions indicated by the media access control control element.

20. The apparatus of claim 19, wherein the instructions are further executable by the one or more processors to cause the apparatus to:

obtain an acknowledgment message responsive to the media access control control element, wherein the cross-link interference report is transmitted on an uplink control channel according to at least an offset from transmitting the acknowledgment message.

21. The apparatus of claim 16, wherein the cross-link interference measurement of the cross-link interference report is generated based at least in part on an event detect at the UE.

22. The apparatus of claim 21, wherein the instructions to obtain the cross-link interference report are executable by the one or more processors to cause the apparatus to:

obtain, on an uplink control channel, uplink control information comprising the cross-link interference report.

23. The apparatus of claim 21, wherein the instructions are further executable by the one or more processors to cause the apparatus to:

obtain a scheduling request from the UE; and output control signaling indicating uplink resources of a shared channel in response to the scheduling request, wherein obtaining the cross-link interference report comprises obtaining, on the uplink resources of the shared channel, a media access control control element comprising the cross-link interference report.

24. The apparatus of claim 16, wherein the instructions are further executable by the one or more processors to cause the apparatus to:

obtain UE capability signaling indicating a threshold offset for an offset between a downlink control information message and an occasion indicated by the downlink control information message for the cross-link interference measurement.

25. A method for wireless communication at a user equipment (UE), comprising:

receiving control signaling indicating a set of cross-link interference measurement occasions and a set of receive beams associated with the set of cross-link interference measurement occasions;

generating, based at least in part on the control signaling and a trigger of a cross-link interference measurement, a cross-link interference report indicating the cross-link interference measurement for at least one receive beam of the set of receive beams; and transmitting, to a network entity, the cross-link interference report.

26. The method of claim 25, further comprising:

performing, at an occasion of the set of cross-link interference measurement occasions, a cross-link interference measurement procedure to generate the cross-link interference measurement using a receive beam of the set of receive beams that corresponds to the occasion, wherein the trigger comprises the occasion.

27. The method of claim 25, further comprising:

receiving a downlink control information message indicating an occasion of the set of cross-link interference measurement occasions and a receive beam corresponding to the occasion; and performing, at the occasion, a cross-link interference measurement procedure to generate the cross-link interference measurement using the receive beam, wherein the trigger comprises the occasion indicated by the downlink control information message.

28. A method for wireless communication at a network entity, comprising:

outputting control signaling indicating a set of cross-link interference measurement occasions and a set of receive beams associated with the set of cross-link interference measurement occasions for a user equipment (UE) to use to generate a cross-link interference report; and obtaining, from the UE, the cross-link interference report indicating a cross-link interference measurement for at least one receive beam of the set of receive beams.

29. The method of claim 28, further comprising:

outputting a downlink control information message indicating an occasion of the set of cross-link interference measurement occasions and a receive beam corresponding to the occasion, wherein the cross-link interference measurement is generated using the receive beam at least in part in response to a trigger that comprises the occasion indicated by the downlink control information message.

30. The method of claim 29, wherein the downlink control information message is scrambled with a radio network temporary identifier that indicates the UE to generate the cross-link interference measurement, the cross-link interference report obtained on an uplink shared channel.

* * * * *